US012627922B2

(12) United States Patent
Chang et al.

(10) Patent No.: US 12,627,922 B2
(45) Date of Patent: May 12, 2026

(54) SPEAKER MODULE

(71) Applicant: Acer Incorporated, New Taipei City (TW)

(72) Inventors: Jia-Ren Chang, New Taipei City (TW); Ming-Chun Fang, New Taipei City (TW); Ruey-Ching Shyu, New Taipei City (TW); Chien-Chung Chen, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 217 days.

(21) Appl. No.: 18/429,559

(22) Filed: Feb. 1, 2024

(65) Prior Publication Data

US 2025/0071473 A1 Feb. 27, 2025

(30) Foreign Application Priority Data

Aug. 24, 2023 (TW) ................................ 112131808

(51) Int. Cl.

| | |
|---|---|
| ***H04R 1/28*** | (2006.01) |
| ***H04R 7/08*** | (2006.01) |
| ***H04R 7/18*** | (2006.01) |
| *H04R 9/02* | (2006.01) |

(52) U.S. Cl.

CPC ........... *H04R 1/288* (2013.01); *H04R 1/2834* (2013.01); *H04R 7/08* (2013.01); *H04R 7/18* (2013.01); *H04R 9/025* (2013.01); *H04R 2499/11* (2013.01)

(58) Field of Classification Search

CPC ........ H04R 1/288; H04R 1/2834; H04R 7/08; H04R 7/18; H04R 9/025; H04R 2499/11; H04R 1/021; H04R 2499/15; H04R 1/2873; H04R 9/06

See application file for complete search history.

(56) References Cited

FOREIGN PATENT DOCUMENTS

| | | | |
|---|---|---|---|
| CN | 101023703 | B | 9/2011 |
| CN | 104811852 | A | 7/2015 |
| CN | 112839270 | A | 5/2021 |
| CN | 116471523 | A | 7/2023 |
| TW | I734382 | B | 7/2021 |
| TW | M615000 | U | 8/2021 |

OTHER PUBLICATIONS

Chinese language office action dated Sep. 12, 2025, issued in application No. TW 113103925.
Chinese language office action dated Mar. 18, 2025, issued in application No. TW 113103925.

*Primary Examiner* — Tuan D Nguyen
(74) *Attorney, Agent, or Firm* — McClure, Qualey & Rodack, LLP

(57) ABSTRACT

A speaker module includes a casing, a speaker unit and a vibration absorber. The speaker unit has a sound cavity. The speaker unit is disposed on the casing, and the speaker unit includes a first diaphragm. The vibration absorber is disposed in the casing, and the vibration absorber has a second diaphragm. When the first diaphragm vibrates, the airflow generated by the first diaphragm drives the second diaphragm to vibrate, and the vibration direction of the second diaphragm is opposite to the vibration direction of the first diaphragm, so as to absorb the vibration generated by the first diaphragm to the casing.

18 Claims, 35 Drawing Sheets

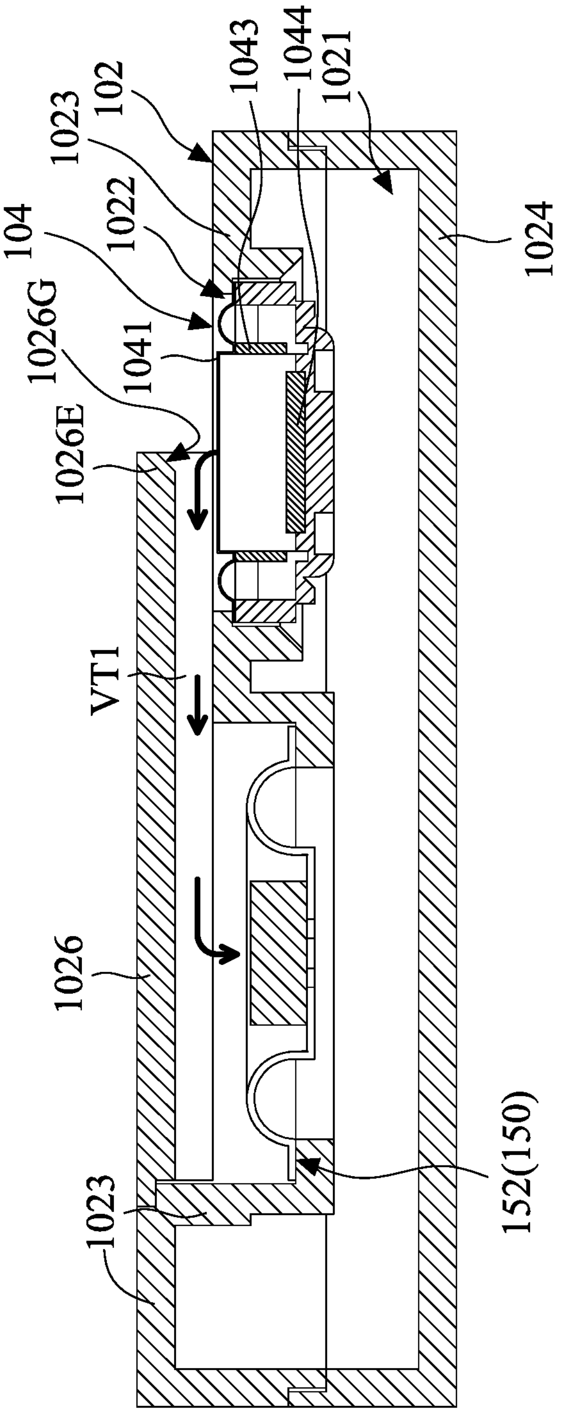
FIG. 16
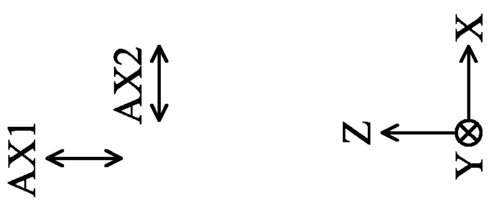

SPEAKER MODULE

CROSS REFERENCE TO RELATED APPLICATIONS

This application claims the benefit of Taiwan Patent Application No. 112131808, filed Aug. 24, 2023, the entirety of which is incorporated by reference herein.

BACKGROUND OF THE INVENTION

Field of the Disclosure

The present disclosure relates to a speaker module, and in particular it relates to a speaker module capable of reducing overall vibration displacement.

Description of the Related Art

As technology has developed, many of today's electronic devices (such as notebook computers) have become quite popular products. These notebook computers are among the most popular and widespread of today's consumer products. Users can execute various applications on notebook computers to achieve various purposes, such as watching videos, playing games, browsing the web, and reading e-books.

Generally speaking, electronic devices such as notebook computers are equipped with at least one speaker module configured to provide sound, including music. However, existing speaker modules generate unnecessary vibration when emitting sound, causing the notebook computer to emit noise. Especially when low-frequency sound effects are emitted, the vibration generated by the speaker module will be particularly obvious, seriously affecting user experience.

Therefore, how to design a speaker module that can reduce the noise generated by vibration is a topic that needs to be discussed.

BRIEF SUMMARY OF THE INVENTION

Accordingly, one objective of the present disclosure is to provide a speaker module to solve the above problems.

The present disclosure provides a speaker module including a casing, a speaker unit and a vibration absorber. The speaker unit has a sound cavity. The speaker unit is disposed on the casing, and the speaker unit includes a first diaphragm. The vibration absorber is disposed in the casing, and the vibration absorber has a second diaphragm. When the first diaphragm vibrates, the airflow generated by the first diaphragm drives the second diaphragm to vibrate, and the vibration direction of the second diaphragm is opposite to the vibration direction of the first diaphragm, so as to absorb the vibration generated by the first diaphragm to the casing.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 16 is a cross-sectional view of the speaker module 100E along line B-B in FIG. 15 according to another embodiment of the present disclosure.

DETAILED DESCRIPTION OF THE INVENTION

Figure 1:
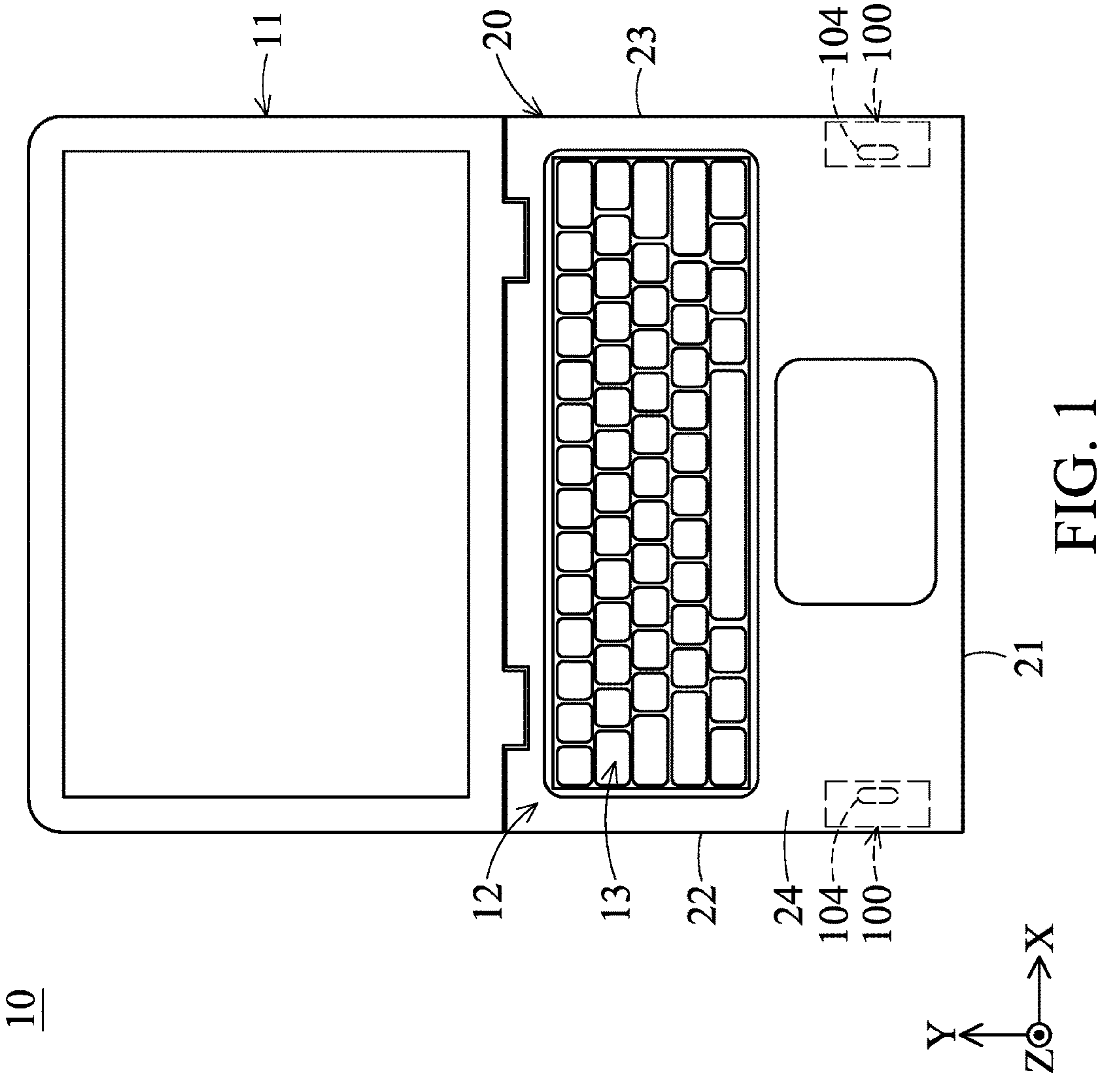
FIG. 1 is a schematic diagram of an electronic device 10 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Please refer to FIG. 1, which is a schematic diagram of an electronic device 10 according to an embodiment of the present disclosure. The electronic device 10 is, for example, a notebook computer with a display module 11 and a host module 12. The host module 12 is connected to the display module 11, and the host module 12 may include a keyboard 13, a housing 20, and two speaker modules 100. The speaker module 100 may be disposed adjacent to at least one of a front side 21, a left side 22, a right side 23 and a top surface 24 of the housing 20.

In this embodiment, as shown in FIG. 1, the two speaker modules 100 are respectively disposed to be adjacent to the left side 22 and the right side 23, but they are not limited thereto. Furthermore, the speaker module 100 includes a speaker unit 104 configured to convert the current signal into an audio signal.

Figure 2:
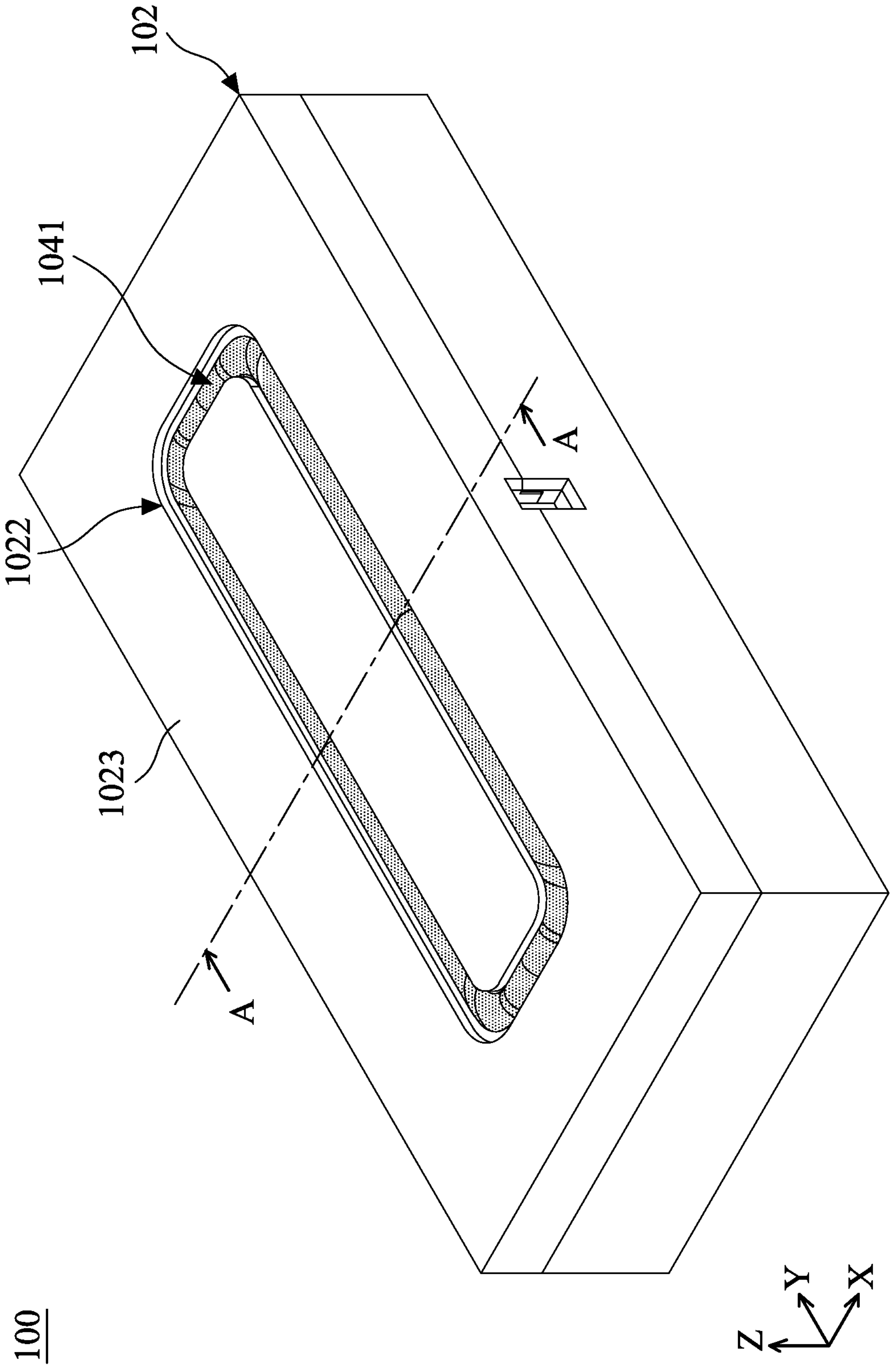
FIG. 2 is a three-dimensional schematic diagram of the speaker module 100 according to an embodiment of the present disclosure.
Figure 3:
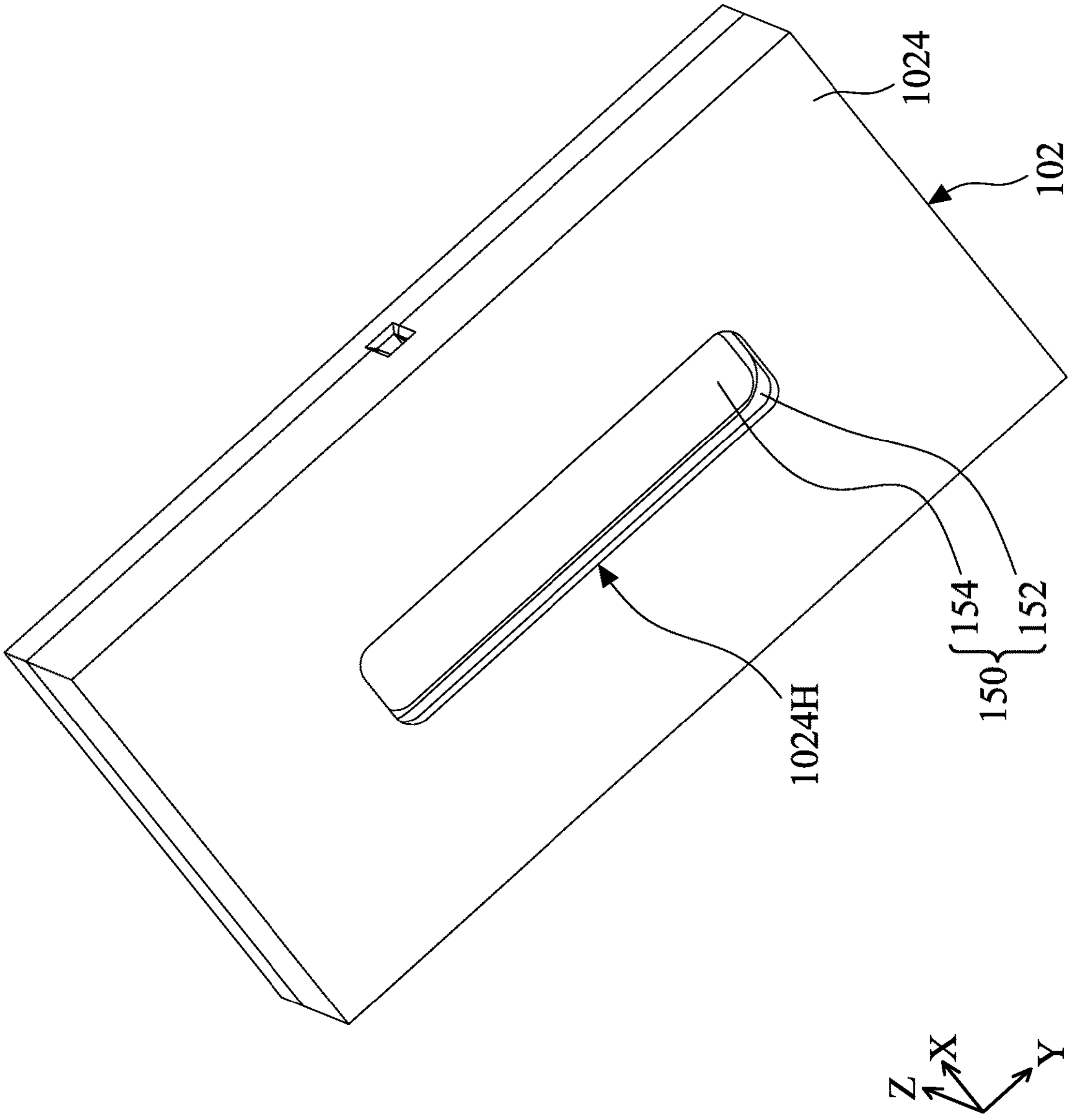
FIG. 3 is a schematic diagram of the speaker module 100 in another view according to an embodiment of the present disclosure.
Figure 4:
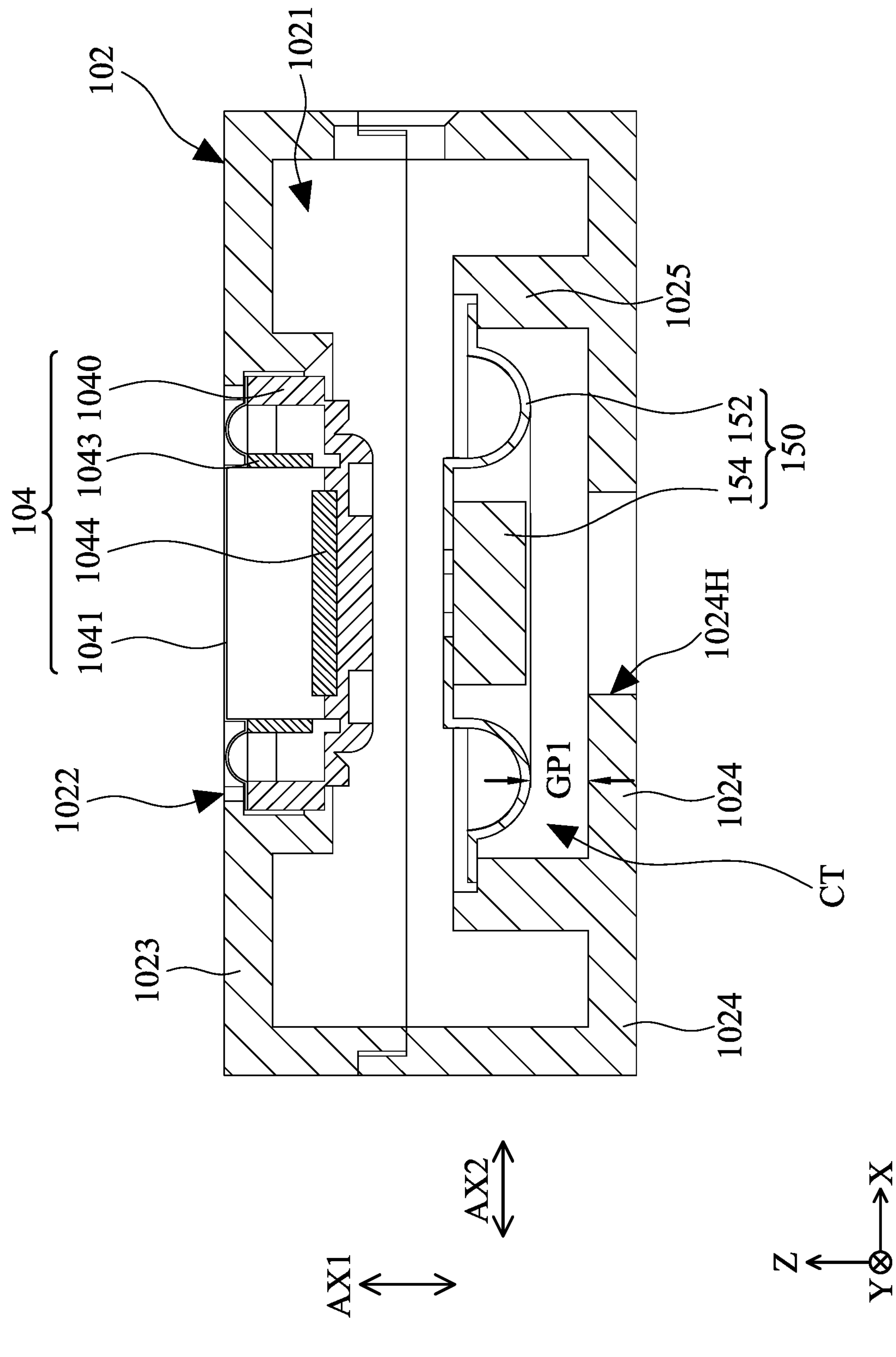
FIG. 4 is a schematic cross-sectional view of the speaker module 100 along the line A-A in FIG. 2 according to an embodiment of the present disclosure.

Next, please refer to FIG. 2 to FIG. 4. FIG. 2 is a three-dimensional schematic diagram of the speaker module 100 according to an embodiment of the present disclosure. FIG. 3 is a schematic diagram of the speaker module 100 in another view according to an embodiment of the present disclosure. FIG. 4 is a schematic cross-sectional view of the speaker module 100 along the line A-A in FIG. 2 according to an embodiment of the present disclosure. In this embodiment, the speaker module 100 includes a casing 102, the aforementioned speaker unit 104 and a vibration absorber 150.

As shown in FIG. 2 and FIG. 4, the casing 102 may have a sound cavity 1021, a sound outlet 1022, a top wall 1023 and a bottom wall 1024. The sound outlet 1022 is formed on the top wall 1023, and the speaker unit 104 is disposed on the top wall 1023 of the casing 102 and communicated with the sound cavity 1021. The speaker unit 104 includes a first diaphragm 1041, and the first diaphragm 1041 is communicated with the sound outlet 1022.

As shown in FIG. 4, the speaker unit 104 may further include a frame 1040, a coil 1043 and a magnet 1044. The frame 1040 is affixed to the casing 102, and the magnet 1044 is fixedly disposed on the frame 1040. Furthermore, the coil 1043 is fixedly connected to the bottom of the first diaphragm 1041, and the first diaphragm 1041 is movably connected to the frame 1040 and suspended above the magnet 1044.

When the coil 1043 receives the control electrical signal, it can act with the magnet 1044 to generate an electromagnetic driving force to drive the first diaphragm 1041 to vibrate relative to the magnet 1044, so that the control electrical signal is converted into the audio signal.

When the first diaphragm 1041 vibrates to emit sound, unnecessary vibration occurs in the entire speaker module 100. In order to reduce the degree of vibration, in this embodiment, the aforementioned vibration absorber 150 is adopted in the speaker module 100 and is disposed in the sound cavity 1021 to absorb the unnecessary vibration.

Specifically, in this embodiment, the vibration absorber 150 is disposed on the bottom wall 1024 of the casing 102, and the vibration absorber 150 has a second diaphragm 152. When the first diaphragm 1041 vibrates, the air flow generated by the first diaphragm 1041 drives the second diaphragm 152 to vibrate, and the vibration direction of the second diaphragm 152 can be opposite to the vibration direction of the first diaphragm 1041, thereby absorbing the vibration generated by the first diaphragm 1041 onto the casing 102.

As shown in FIG. 4, the first diaphragm 1041 and the second diaphragm 152 are arranged along a first axis AX1 (the Z-axis), and when viewed along the first axis AX1, the first diaphragm 1041 completely overlaps the second diaphragm 152. In this embodiment, the size of the first diaphragm 1041 is smaller than the second diaphragm 152. For example, the area of the first diaphragm 1041 is smaller than the area of the second diaphragm 152.

In addition, the weight of the first diaphragm 1041 is different from the weight of the second diaphragm 152. For example, the weight of the first diaphragm 1041 is greater than the weight of the second diaphragm 152. In addition, the total weight of the first diaphragm 1041 and the coil 1043 is greater than the weight of the second diaphragm 152.

In order for the vibration absorber 150 to effectively absorb the vibration generated by the first diaphragm 1041, the vibration absorber 150 may further include a counterweight 154, fixedly connected to the bottom of the second diaphragm 152, and the total weight of the counterweight 154 and the second diaphragm 152 may be equal to the total weight of first diaphragm 1041 and the coil 1043.

As shown in FIG. 4, the casing 102 may further include a support structure 1025 which is fixedly connected to the bottom wall 1024 of the casing 102, and the second diaphragm 152 is movably connected to the support structure 1025. Specifically, the support structure 1025 is protruded from the bottom wall 1024 along the first axis AX1, and the outer edge of the second diaphragm 152 is fixedly connected to the support structure 1025.

In this embodiment, the support structure 1025, the second diaphragm 152 and the bottom wall 1024 may form a chamber CT, and the chamber CT and the sound cavity 1021 do not communicate with each other. That is, the air in the sound cavity 1021 does not flow into the chamber CT.

In this embodiment, at least one opening 1024H is formed on the bottom wall 1024, and the t least one opening 1024H corresponds to the second diaphragm 152. In addition, when viewed along the first axis AX1, the at least one opening 1024H overlaps the first diaphragm 1041 and the second diaphragm 152.

In addition, because the air flow generated from the vibration of the first diaphragm 1041 drives the second diaphragm 152 to vibrate, a gap GP1 needs to be formed between the second diaphragm 152 and the bottom wall 1024. For example, when viewed along a second axis AX2 (the X-axis) perpendicular to the first axis AX1, the distance between the second diaphragm 152 and the bottom wall 1024 along the first axis AX1 is greater than or equal to 2 mm. That is, the gap GP1 is greater than or equal to 2 mm.

Figure 5:
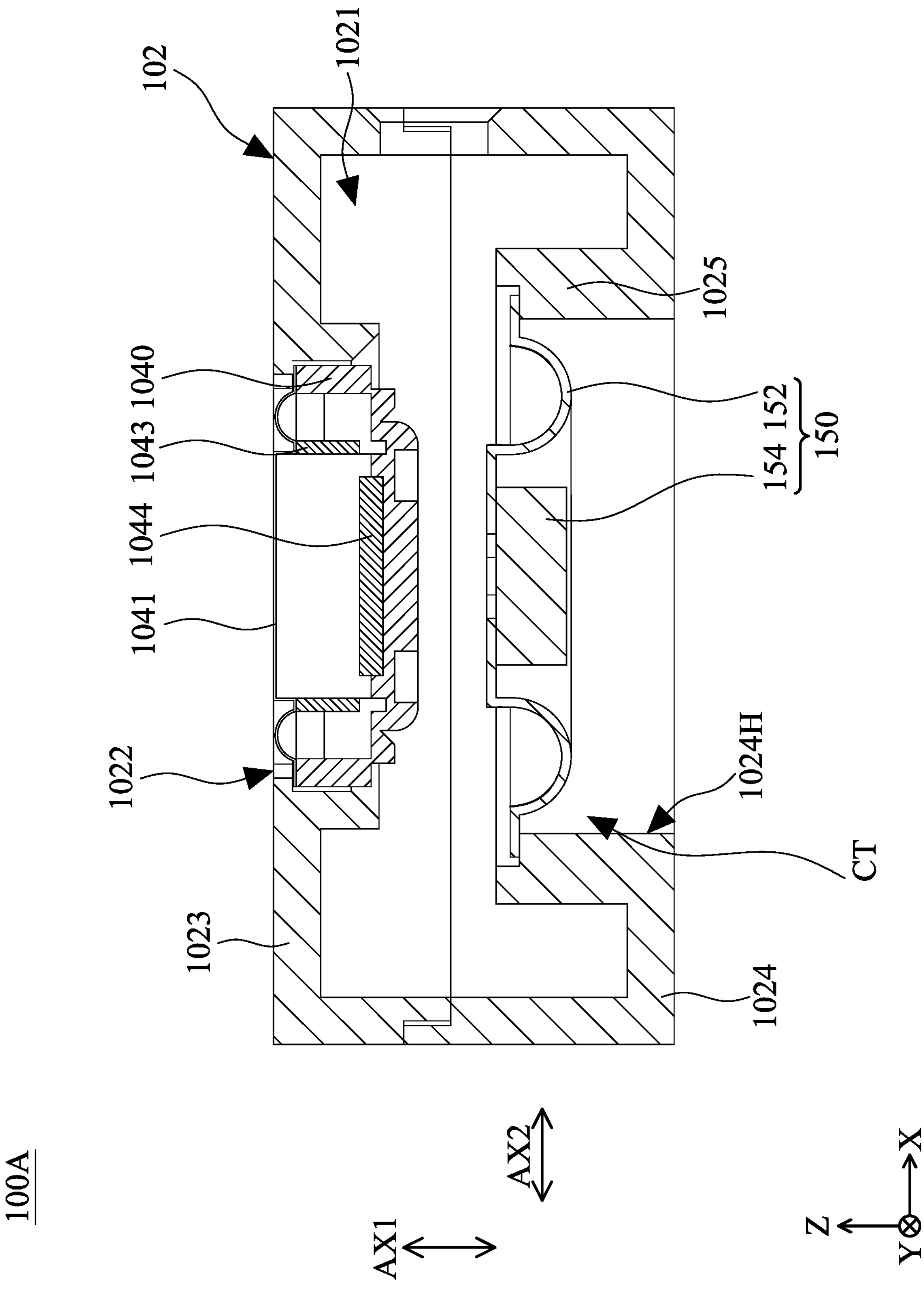
FIG. 5 is a schematic cross-sectional view of the speaker module 100A along the line A-A in FIG. 2 according to another embodiment of the present disclosure.

It should be noted that the size of opening 1024H is not limited to this embodiment. Different designs are possible in other embodiments. Please refer to FIG. 5 and FIG. 6. FIG. 5 is a schematic cross-sectional view of the speaker module 100A along the line A-A in FIG. 2 according to another embodiment of the present disclosure, and FIG. 6 is a schematic three-dimensional diagram of the speaker module 100B in another view according to another embodiment of the present disclosure.

As shown in FIG. 5, the opening 1024H formed by the bottom wall 1024 can be further expanded. Specifically, when viewed along the first axis AX1, the opening 1024H is formed by the inner wall surface of the support structure 1025.

Figure 6:
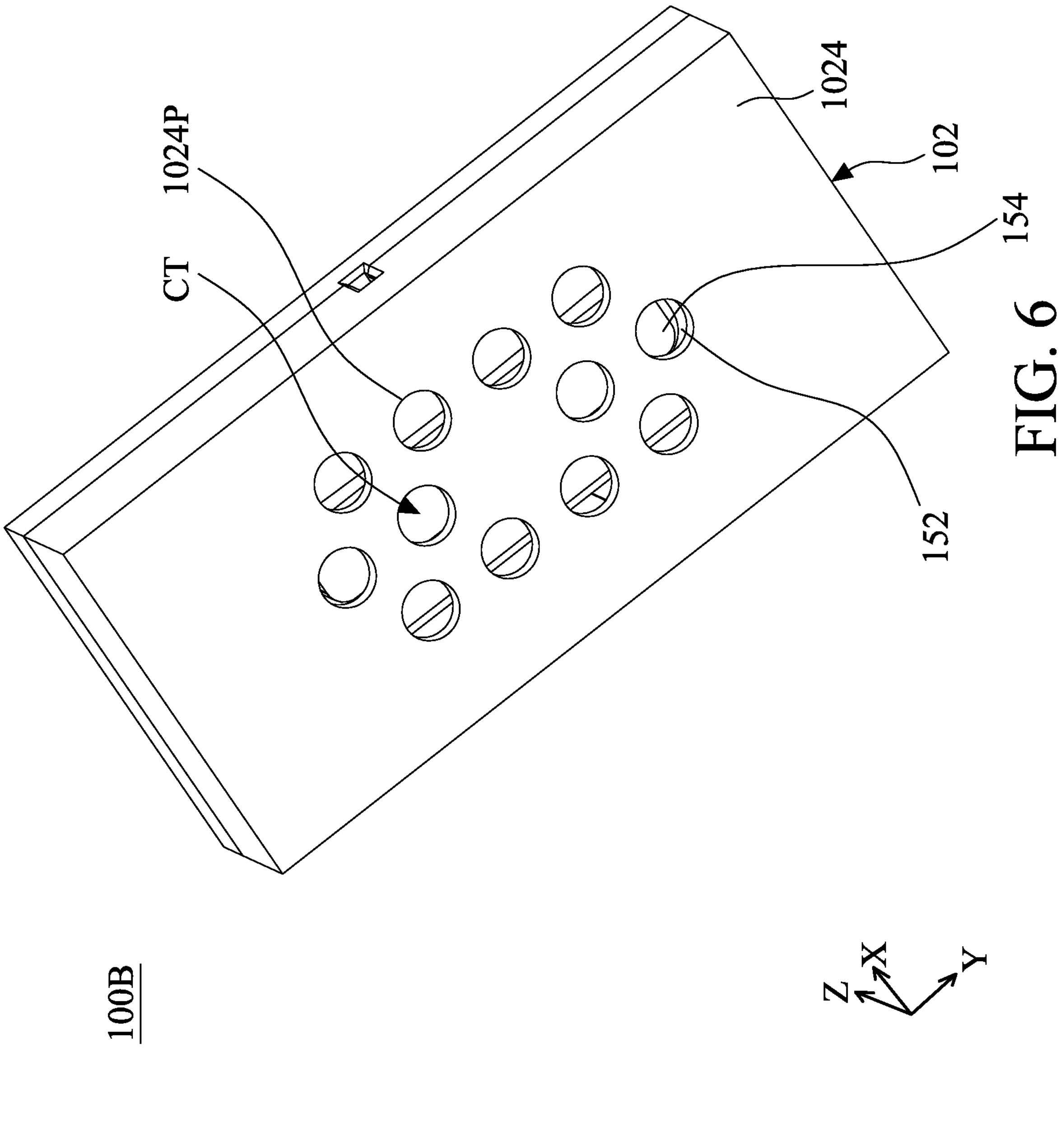
FIG. 6 is a schematic three-dimensional diagram of the speaker module 100B in another view according to another embodiment of the present disclosure.

In addition, as shown in FIG. 6, a plurality of smaller holes 1024P can be formed on the bottom wall 1024 so as to connect the chamber CT with the external environment. It should be noted that the shape, size or number of the openings 1024H or the holes 1024P formed by bottom wall 1024 does not affect the vibration absorbing effect of vibration absorber 150. As long as the bottom wall 1024 has at least one opening that connects the chamber CT to the external environment, the vibration absorber 150 can absorb the vibration.

Figure 7:
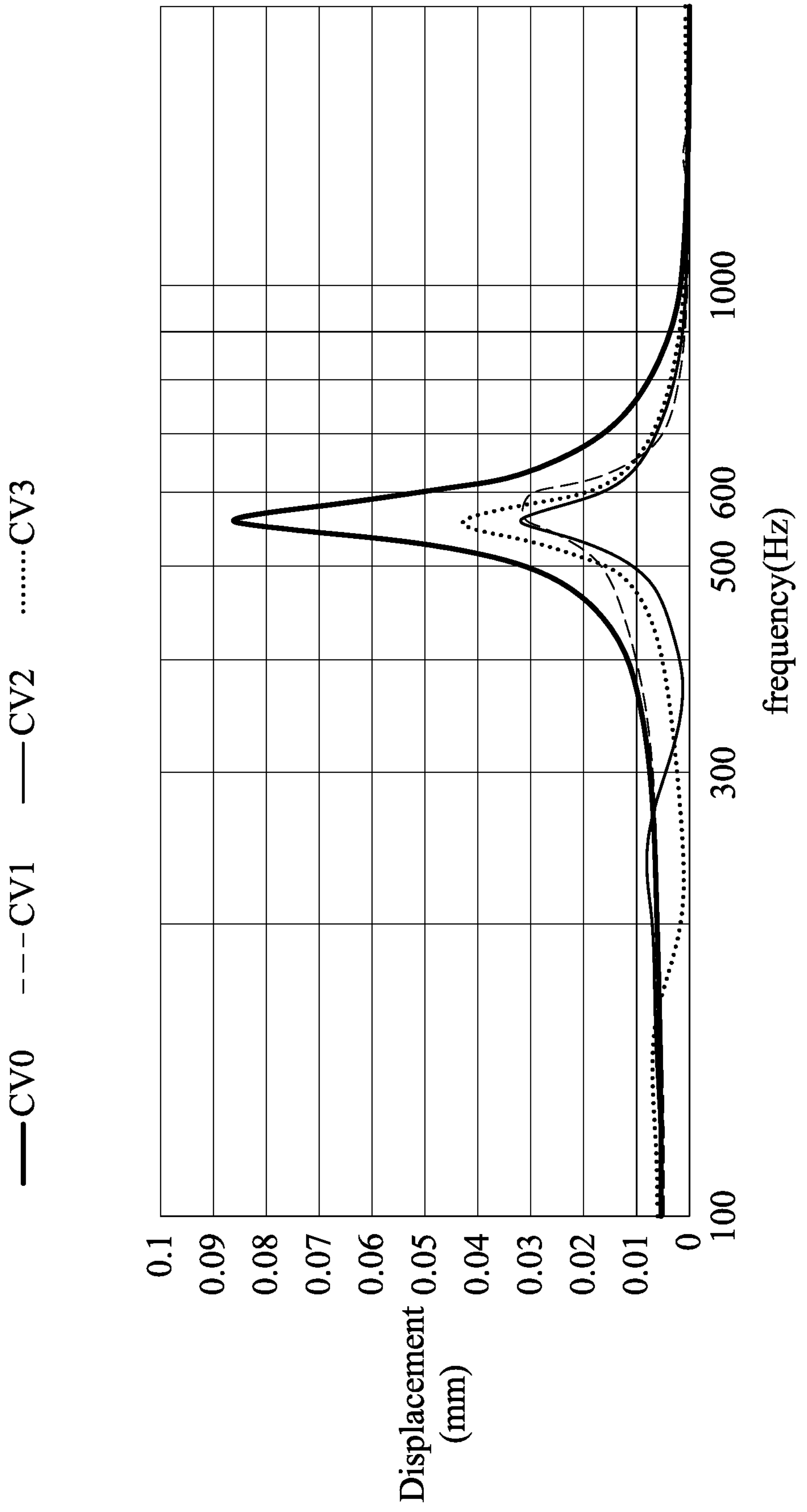
FIG. 7 is a chart illustrating the relationship between vibration displacement and frequency of the speaker modules of and a conventional speaker module according to different embodiments of the present disclosure.

Next, please refer to FIG. 7, which is a chart illustrating the relationship between vibration displacement and frequency of the speaker modules of and a conventional speaker module according to different embodiments of the present disclosure. In FIG. 7, the curve CV0 represents the relationship between frequency and vibration displacement of a conventional speaker module, and the curve CV1 represents the relationship between frequency and vibration displacement of the speaker module 100 after being equipped with the vibration absorber 150 (but excluding the counterweight 154). Furthermore, the curve CV2 represents the relationship between the frequency and vibration displacement of a speaker module 100A (but not including the counterweight 154), and the curve CV3 represents the relationship between the frequency and vibration displacement of the speaker module 100A (including the counterweight 154).

As shown in the curve CV0 in FIG. 7, the conventional speaker module without the vibration absorber 150 will have the maximum vibration displacement between the frequency of 500 Hz and 600 Hz. Such vibration displacement will cause the electronic device 10 to generate unnecessary noise, affecting the user's experience. After adding the vibration absorber 150, the vibration displacement of the speaker module 100 can be effectively reduced.

As shown in the curve CV1, the maximum vibration displacement of the speaker module 100 of this embodiment between the frequency of 500 Hz and 600 Hz can be reduced to less than 0.033 mm. In addition, as shown in the curve CV2, the maximum vibration displacement of the speaker module 100 of this embodiment between the frequency of 500 Hz and 600 Hz can also be reduced to less than 0.033 mm.

For example, as shown in the curve CV3, the vibration absorber 150 of the speaker module 100 of this embodiment includes the counterweight 154, whose weight is 1.5 grams, and the maximum vibration displacement between the frequency of 500 Hz and 600 Hz can also be reduced to less than 0.043 mm. Furthermore, the maximum vibration displacement at the frequency below 300 Hz can also be reduced to less than 0.005 mm. Therefore, the embodiment of the curve CV3 can not only reduce the maximum vibration displacement between the frequency of 500 Hz and 600

Hz, but also improve the bass output below 300 Hz without producing low-frequency noise.

Figure 8:
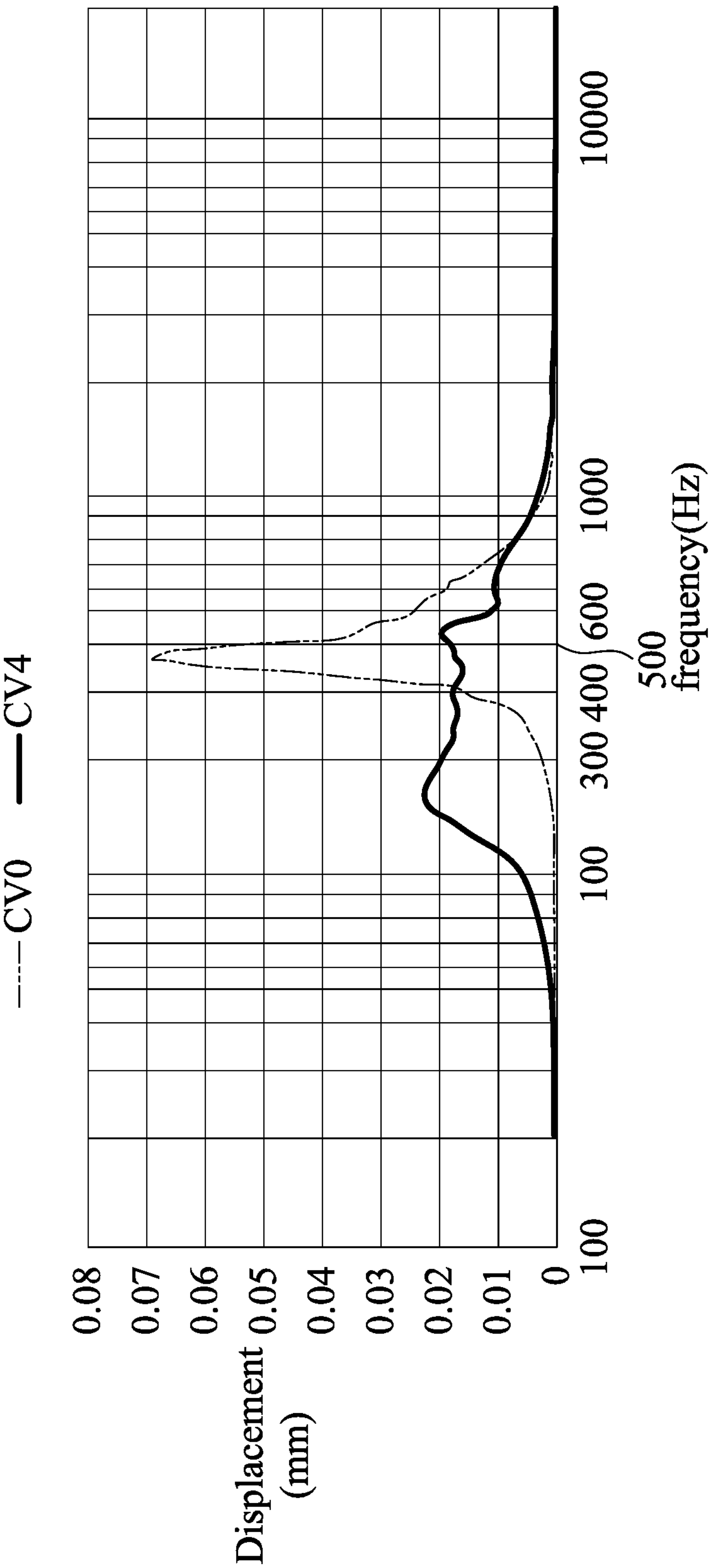
FIG. 8 is a chart illustrating the relationship between vibration displacement and frequency of the speaker module 100A and a conventional speaker module according to another embodiment of the present disclosure.

Next, please refer to FIG. 8, which is a chart illustrating the relationship between vibration displacement and frequency of the speaker module 100A and a conventional speaker module according to another embodiment of the present disclosure. In this embodiment, the weight of the counterweight 154 is equal to 2 grams, and the curve CV4 represents the relationship between the frequency and vibration displacement of the speaker module 100A.

As shown in the curve CV0 in FIG. 8, the conventional speaker module without the vibration absorber 150 has the maximum vibration displacement (for example, 0.069 mm) between the frequency of 400 Hz and 600 Hz. Furthermore, as shown in the curve CV4, the maximum vibration displacement of the speaker module 100A of this embodiment between the frequency of 400 Hz and 600 Hz can be reduced to less than 0.02 mm.

According to the above charts, it can be seen that the vibration absorber 150 of the present disclosure can effectively reduce the vibration generated by the first diaphragm 1041. For example, the displacement generated by the vibration can be reduced by about 70%. It should be noted that in order for the vibration absorber 150 to effectively absorb the vibration generated by the first diaphragm 1041, the resonance frequency of the second diaphragm 152 is less than or equal to 300 Hz, such as 250 Hz, 200 Hz, 150 Hz, and so on.

Furthermore, the vibration absorber 150 conforms to the following relationship (1):

$$f = \frac{1}{2\pi}\sqrt{\frac{k}{m}} \tag{1}$$

In the relationship, f is the resonance frequency of the second diaphragm 152, k is the stiffness (the elastic coefficient) of the second diaphragm 152, and m is the total weight of the second diaphragm 152 and the counterweight 154.

That is, the elastic coefficient of the second diaphragm 152 can be selected according to the above relationship (1), and the required resonance frequency can also be adjusted by increasing the weight of the counterweight 154. In other words, the required resonance frequency can be determined according to the speaker module of different embodiments to achieve the best vibration reduction effect.

Figure 9:
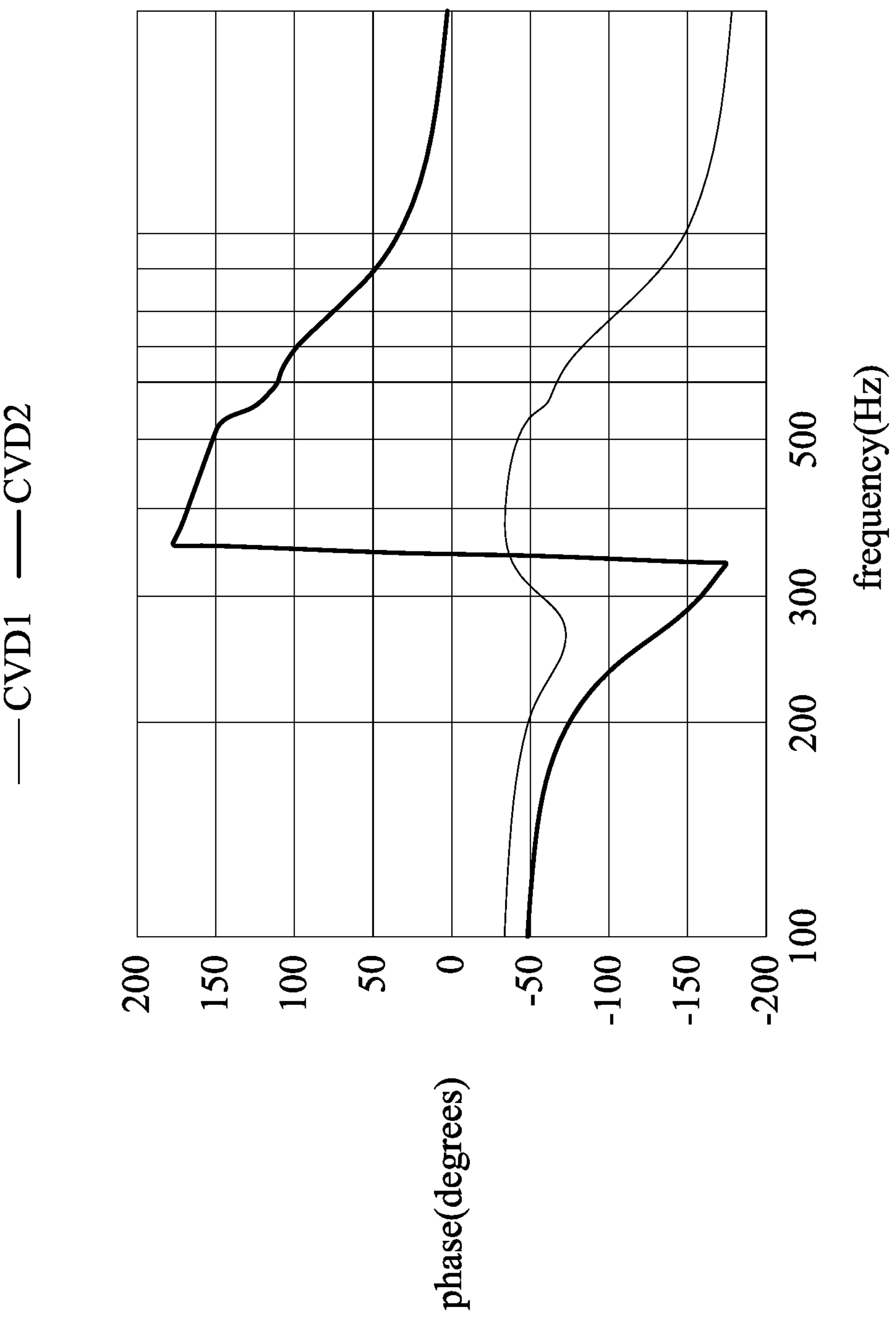
FIG. 9 is a chart illustrating the relationship between phase and frequency of the first diaphragm 1041 and the second diaphragm 152 according to an embodiment of the present disclosure.

Next, please refer to FIG. 9, which is a chart illustrating the relationship between phase and frequency of the first diaphragm 1041 and the second diaphragm 152 according to an embodiment of the present disclosure. The curve CVD1 represents the relationship between frequency and phase of the first diaphragm 1041, and the curve CVD2 represents the relationship between frequency and phase of the second diaphragm 152.

Based on the design of the resonant frequency of the second diaphragm 152, as shown in FIG. 9, when the frequency is below 330 Hz, the phases of the first diaphragm 1041 and the second diaphragm 152 are the same, and when the frequency is above 330 Hz, The phase of the first diaphragm 1041 opposite to the phase of the second diaphragm 152.

That is, when the frequency is above 330 Hz, the moving direction of the first diaphragm 1041 along the Z-axis is opposite to the moving direction of the second diaphragm 152 along the Z-axis. Therefore, based on such a design, the vibration absorber 150 can effectively absorb the vibration generated by the first diaphragm 1041.

Figure 10:
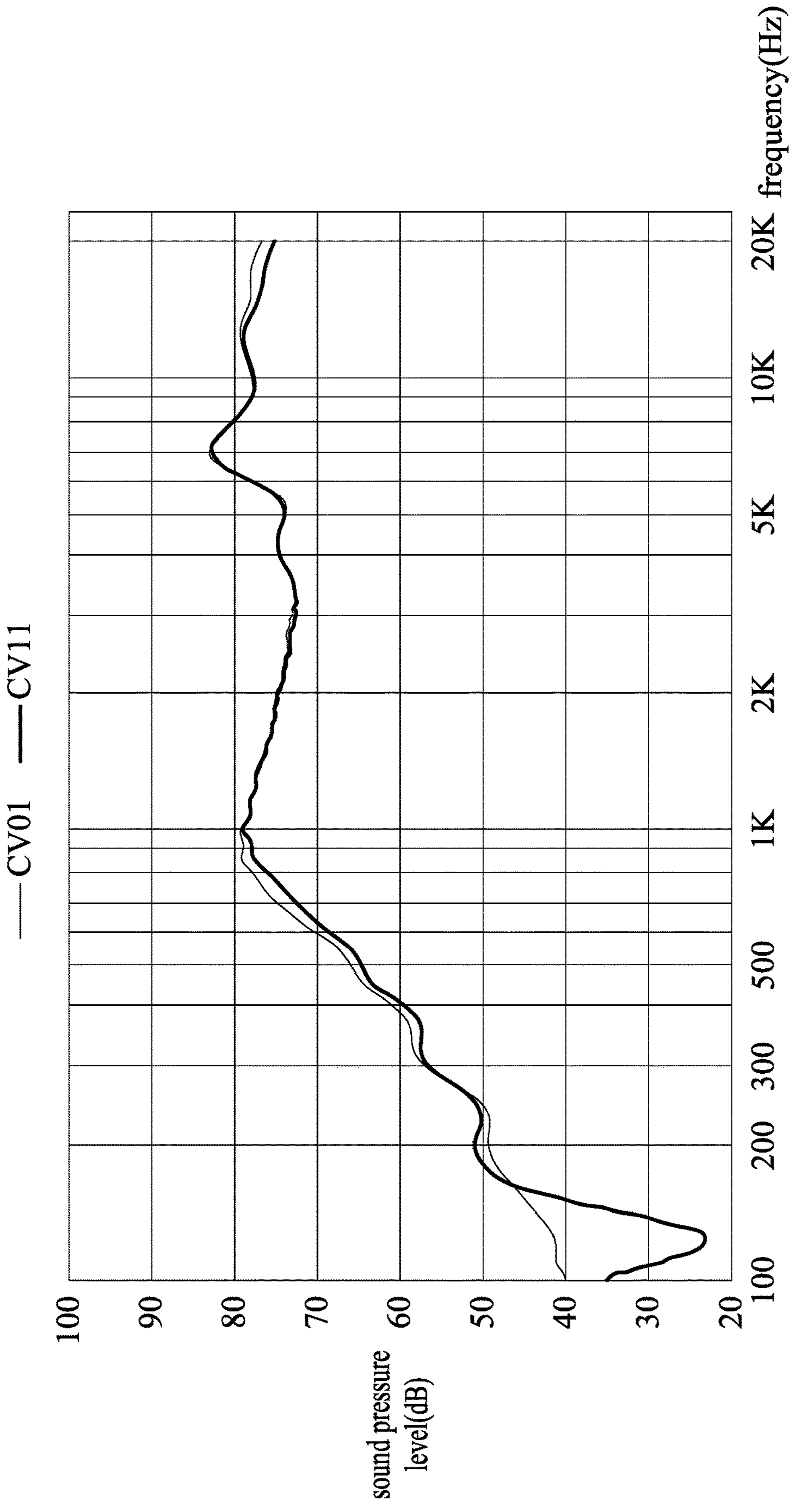
FIG. 10 is a chart illustrating the relationship between frequency and sound pressure level of the speaker module 100A and a conventional speaker module according to another embodiment of the present disclosure.
Figure 11:
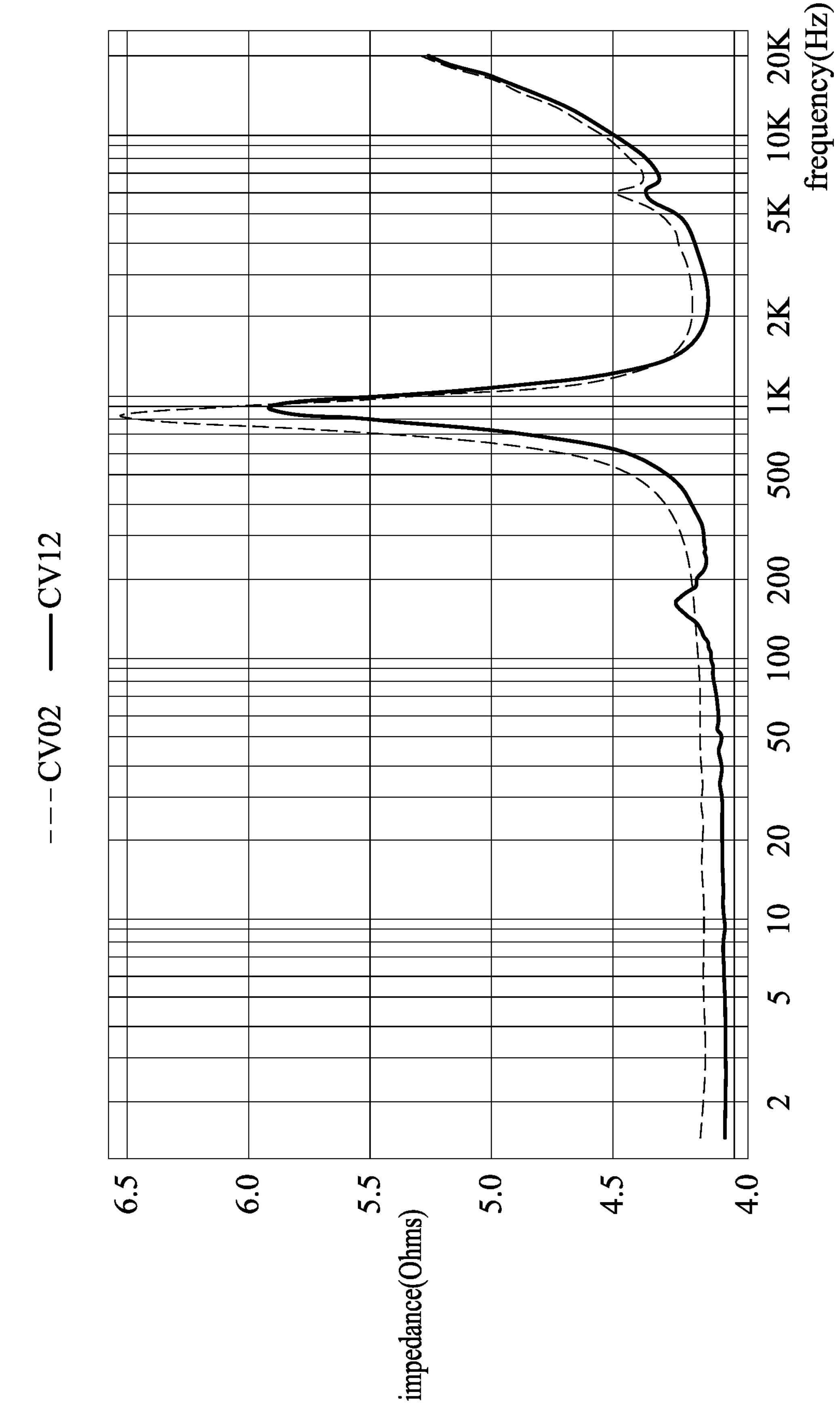
FIG. 11 is a chart illustrating the relationship between frequency and impedance of the speaker module 100A and a conventional speaker module according to another embodiment of the present disclosure.
Figure 12:
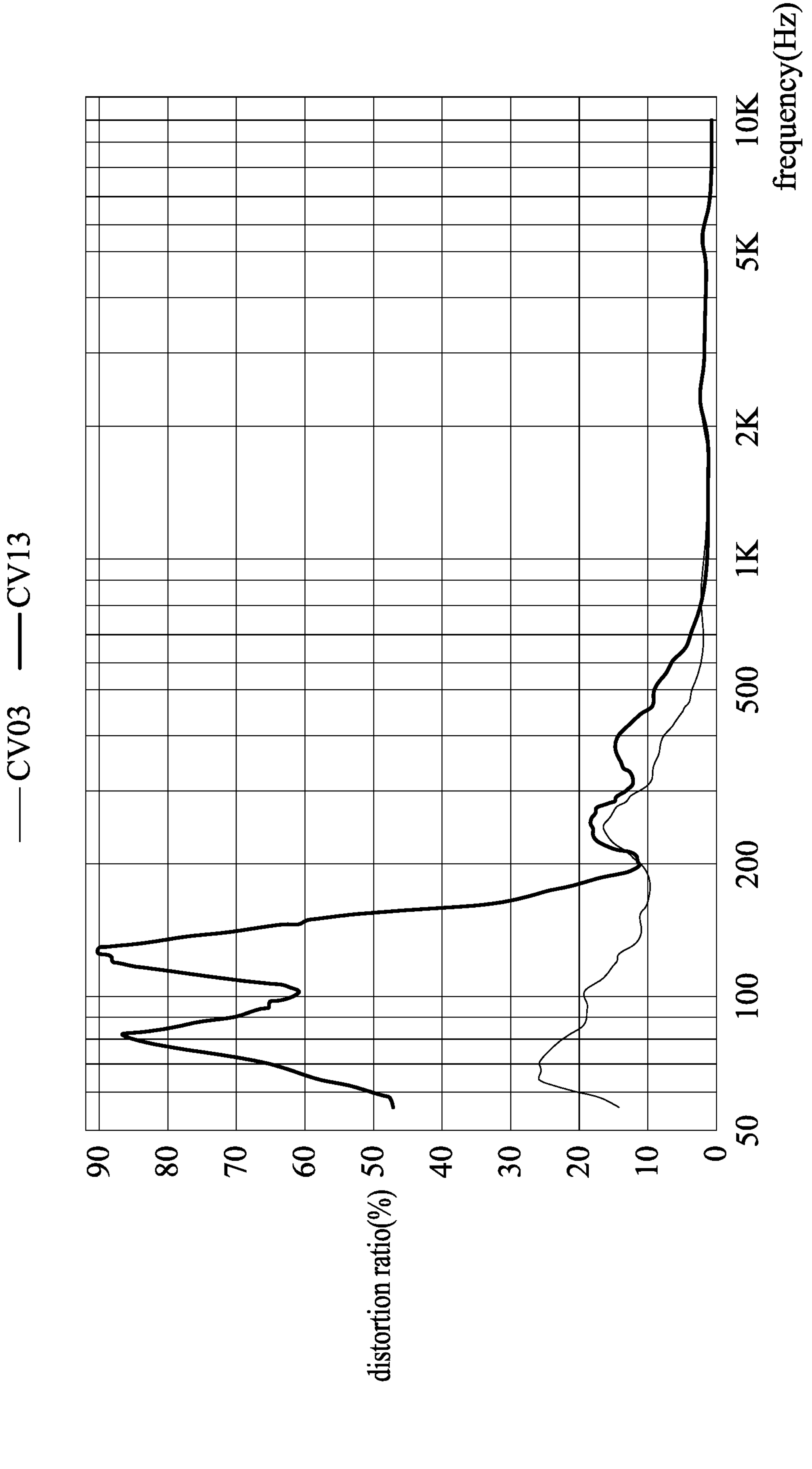
FIG. 12 is a chart illustrating the relationship between frequency and distortion ratio of the speaker module 100A and a conventional speaker module according to another embodiment of the present disclosure.

Next, please refer to FIG. 10 to FIG. 12. FIG. 10 is a chart illustrating the relationship between frequency and sound pressure level of the speaker module 100A and a conventional speaker module according to another embodiment of the present disclosure. FIG. 11 is a chart illustrating the relationship between frequency and impedance of the speaker module 100A and a conventional speaker module according to another embodiment of the present disclosure. FIG. 12 is a chart illustrating the relationship between frequency and distortion ratio of the speaker module 100A and a conventional speaker module according to another embodiment of the present disclosure.

The curve CV01 represents the sound pressure level curve of the conventional speaker module at different frequencies, and the curve CV11 represents the sound pressure level curve of the speaker module 100A of the present disclosure at different frequencies. As shown in FIG. 10, when the frequency is above 300 Hz, the sound pressure level (SPL) of the curve CV01 and the curve CV11 has little difference (less than 5%).

Although the difference in sound pressure level between the curve CV01 and the curve CV11 is large when the frequency is below 200 Hz, because the sound below 200 Hz is inaudible to the human ear, thus this difference does not affect the user's experience.

Furthermore, in FIG. 11, the curve CV02 represents the impedance curve of the conventional speaker module at different frequencies, and the curve CV12 represents the impedance curve of the speaker module 100A of the present disclosure at different frequencies. As shown in FIG. 11, the waveform of the curve CV02 is not much different from the waveform of the curve CV12. That is, after adding the vibration absorber 150, the output performance of the speaker module 100A is not greatly affected.

In FIG. 12, the curve CV03 represents the distortion ratio of the conventional speaker module at different frequencies, and the curve CV13 represents the distortion ratio of the speaker module 100A of the present disclosure at different frequencies.

As shown in FIG. 12, compared with the conventional speaker module, the distortion ratio of the speaker module 100A of the present disclosure has increased significantly at low frequencies (for example, below 200 Hz). However, because the sound below 200 Hz is not audible to the human ear, so the distortion below 200 Hz can be negligible.

Figure 13:
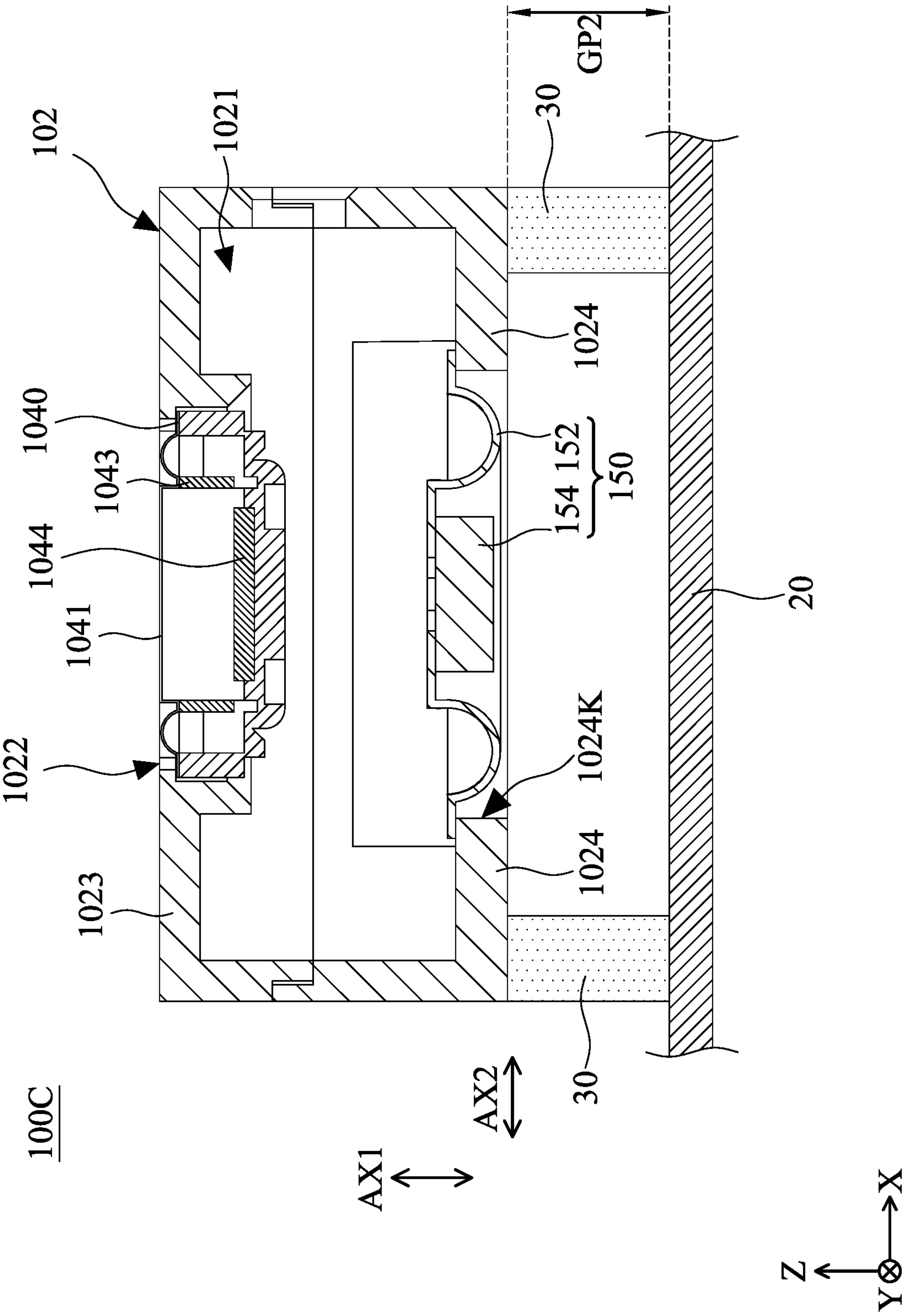
FIG. 13 is a schematic cross-sectional view of a speaker module 100C according to another embodiment of the present disclosure.

Please refer to FIG. 13, which is a schematic cross-sectional view of a speaker module 100C according to another embodiment of the present disclosure. The speaker module 100C of this embodiment is similar to the speaker module 100A. The difference between them is that the casing 102 of this embodiment omits the support structure 1025, and the second diaphragm 152 is directly disposed on the bottom wall 1024.

Correspondingly, a bottom opening 1024K is formed on the bottom wall 1024, and a portion of the second diaphragm 152 is disposed in the bottom opening 1024K. Specifically, when viewed along the second axis AX2, a portion of the second diaphragm 152 overlaps the bottom wall 1024, and a portion of the counterweight 154 overlaps the bottom wall 1024.

In addition, in order to avoid the second diaphragm 152 from colliding with the housing 20 of the host module 12 when vibrating, the electronic device 10 may further include two supporting members 30 which are disposed between the housing 20 and the bottom wall 1024. That is, the spacing GP2 between the bottom wall 1024 and the housing 20 along the Z axis is greater than 2 mm. In addition, the supporting member 30 can be made of elastic material, such as rubber material, which can further reduce the vibration generated by the speaker module 100C.

Figure 14:
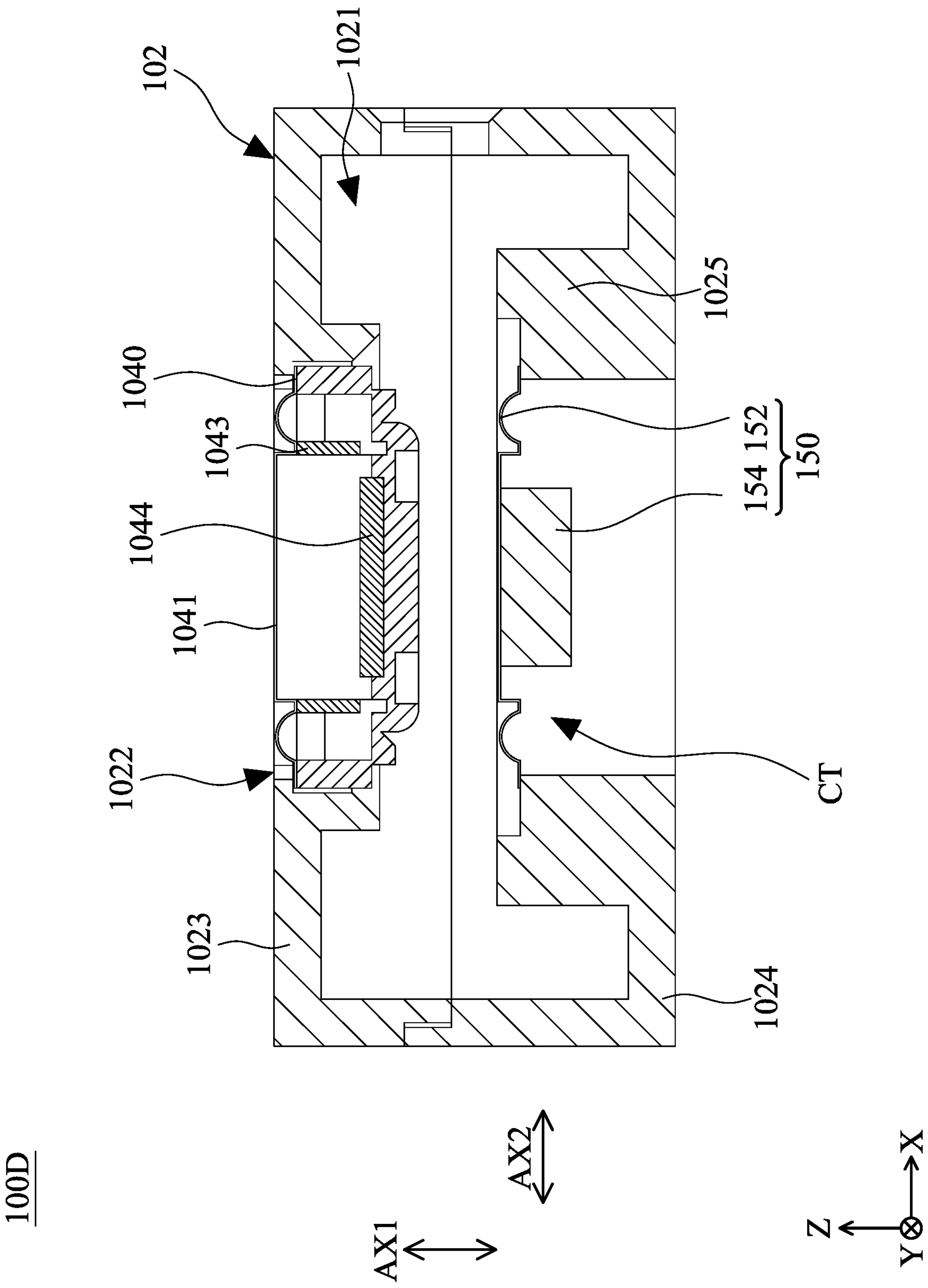
FIG. 14 is a schematic cross-sectional view of a speaker module 100D according to another embodiment of the present disclosure.

Next, please refer to FIG. 14, which is a schematic cross-sectional view of a speaker module 100D according to another embodiment of the present disclosure. In this embodiment, the texture, shape, elastic coefficient and weight of the second diaphragm 152 are equal to the texture, shape, elastic coefficient and weight of the first diaphragm 1041. Based on this configuration, when the first diaphragm 1041 vibrates, the second diaphragm 152 can vibrate in the opposite direction to the first diaphragm 1041, so that the aforementioned effect of reducing the overall vibration of the speaker module can also be achieved.

In addition, it should be noted that the weight of the counterweight 154 may be equal to the weight of the coil 1043. That is, the total weight of the first diaphragm 1041 and the coil 1043 is equal to the total weight of the second diaphragm 152 and the counterweight 154. Based on this design, the speaker module 100D can achieve better vibration absorption effect. In addition, in other embodiments, the weight of the second diaphragm 152 can be designed to be equal to the total weight of the first diaphragm 1041 and the coil 1043. That is, the counterweight 154 is omitted, which can further reduce the overall volume of the speaker module 100D so as to achieve the purpose of miniaturization.

Figure 15:
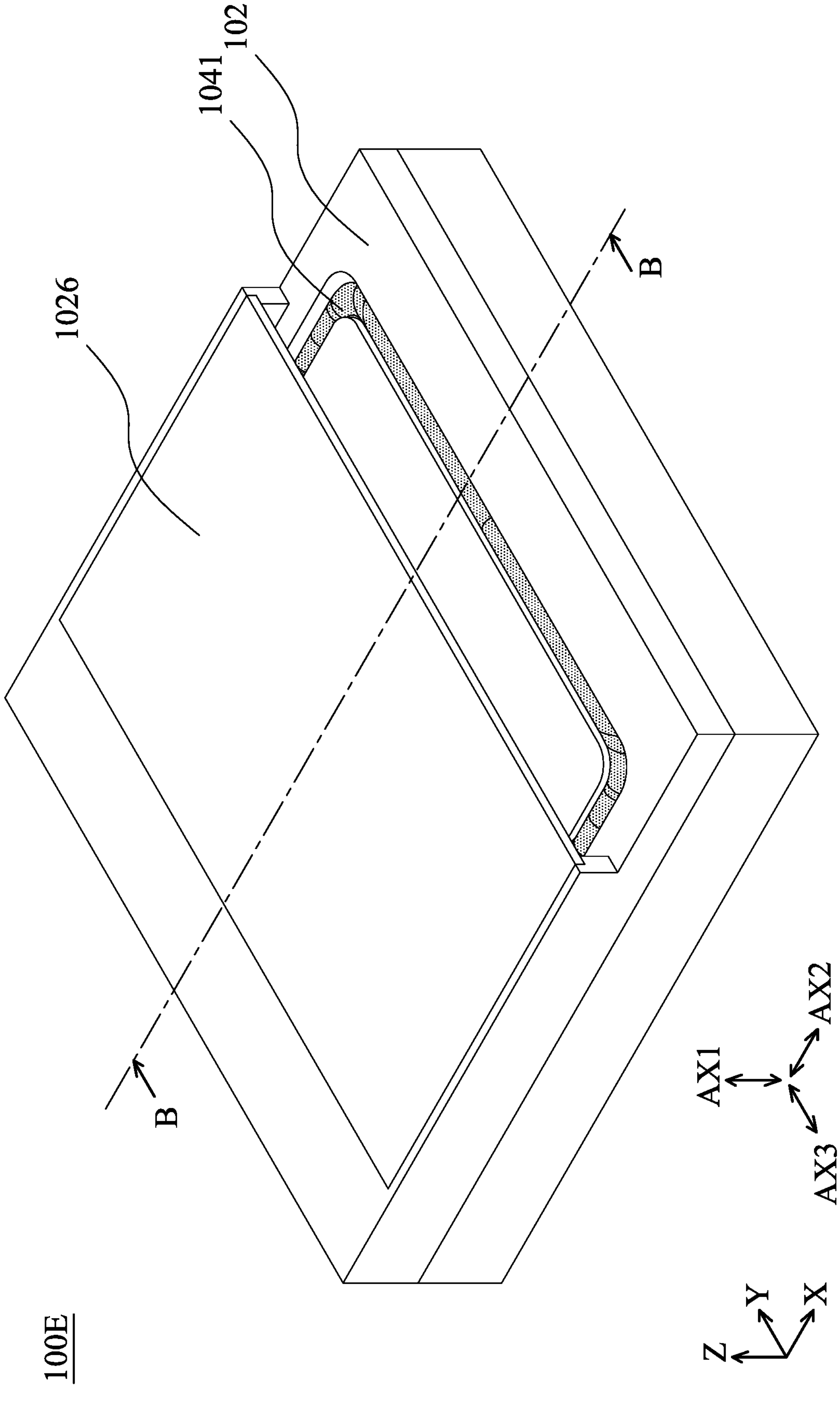
FIG. 15 is a three-dimensional schematic diagram of a speaker module 100E according to another embodiment of the present disclosure.

Next, please refer to FIG. 15 to FIG. 16. FIG. 15 is a three-dimensional schematic diagram of a speaker module 100E according to another embodiment of the present disclosure, and FIG. 16 is a cross-sectional view of the speaker module 100E along line B-B in FIG. 15 according to another embodiment of the present disclosure. In this embodiment, as shown in FIG. 16, the speaker unit 104 and the vibration absorber 150 are arranged along the first axis AX1.

Specifically, the first diaphragm 1041 and the coil 1043 are arranged along the first axis AX1, and the first diaphragm 1041 and the second diaphragm 152 are arranged along the second axis AX2. As shown in FIG. 16, when viewed along the first axis AX1, the first diaphragm 1041 does not overlap the second diaphragm 152.

Furthermore, the casing 102 includes a top wall 1023 and a bottom wall 1024, and the speaker unit 104 and the vibration absorber 150 are disposed on the top wall 1023. In this embodiment, the casing 102 further includes a covering member 1026 formed on the top wall 1023. Specifically, the covering member 1026 is fixedly connected to the top wall 1023, and the covering member 1026 and the top wall 1023 can be integrally formed in one piece.

As shown in FIG. 15 and FIG. 16, when viewed along the first axis AX1, the covering member 1026 completely covers the second diaphragm 152. Furthermore, when viewed along first axis AX1, the covering member 1026 covers a portion of the first diaphragm 1041. For example, the covering member 1026 may cover half of the first diaphragm 1041, but it is not limited thereto.

As shown in FIG. 16, the covering member 1026 and the top wall 1023 form a sound channel VT1 which is connected to the second diaphragm 152. It should be noted that sound channel VT1 and sound cavity 1021 do not communicate with each other. Furthermore, the bottom wall 1024 does not form any openings or holes.

When the first diaphragm 1041 vibrates, a portion of the airflow is not blocked by the covering member 1026 and flows to the external environment to generate sound, while the other portion of the airflow is blocked by the covering member 1026 and flows in the direction of the arrow in FIG. 16 into the sound channel VT1 to drive the second diaphragm 152 to vibrate, thereby reducing the overall vibration of the speaker module 100E.

In order to effectively guide a portion of the airflow into the sound channel VT1, as shown in FIG. 16, when viewed along a third axis AX3, an end 1026E of the covering member 1026 can be formed with a guiding structure 1026G to guide the aforementioned airflow. The third axis AX3 is perpendicular to the first axis AX1 and the second axis AX2.

For example, when viewed along the third axis AX3, the guiding structure 1026G may be a bevel structure, but it is not limited thereto. In other embodiments, the guiding structure 1026G may also be a triangular structure or an arc structure.

In this embodiment, the texture and shape of the second diaphragm 152 are different from the texture and shape of the first diaphragm 1041, but they are not limited thereto. In other embodiments, the texture, shape, and elastic coefficient of the second diaphragm 152 may be equal to the texture, shape, and elastic coefficient of the first diaphragm 1041. As long as the resonant frequency of the second diaphragm 152 is less than 300 Hz, it falls within the scope of the present disclosure.

Figure 17:
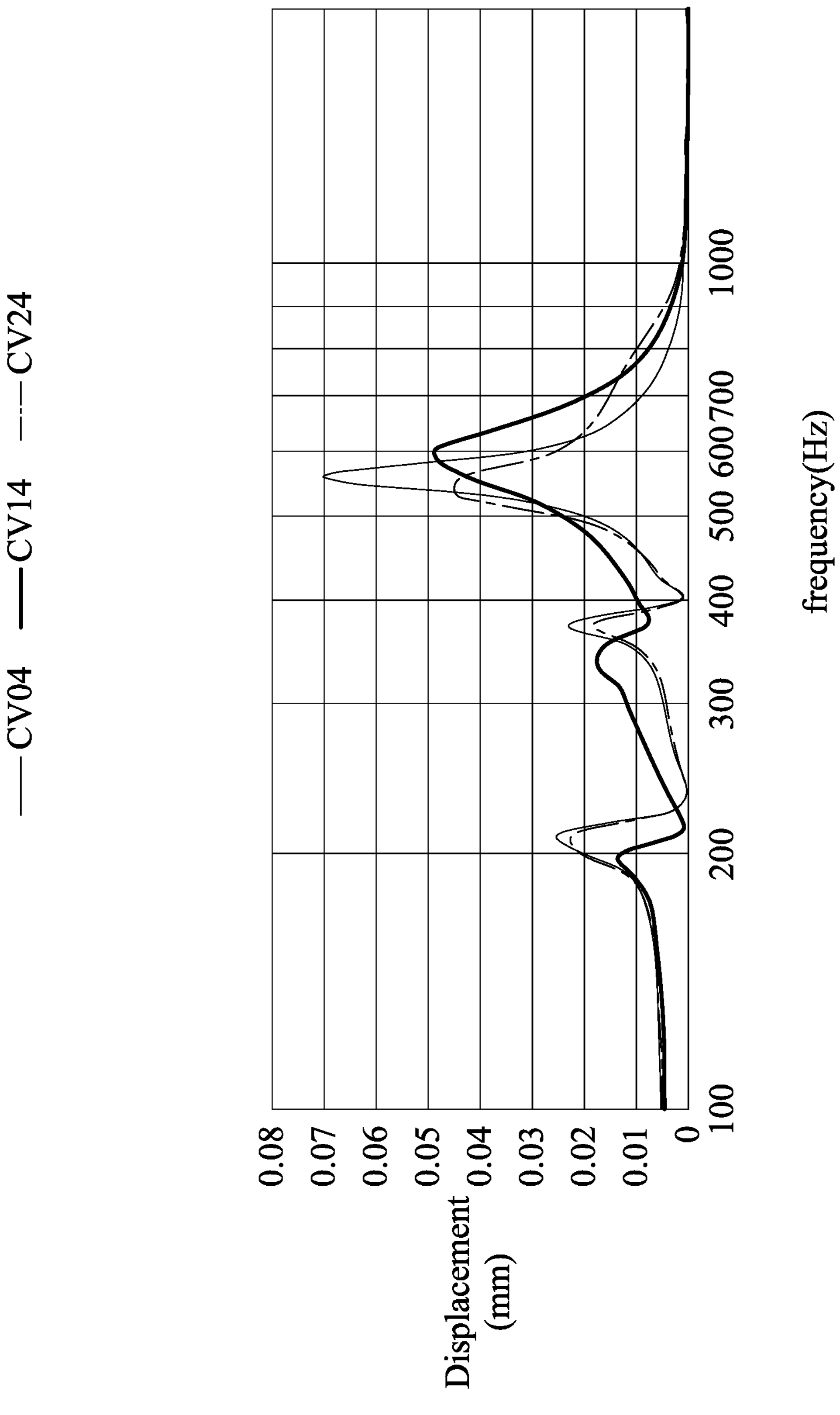
FIG. 17 is a chart illustrating the relationship between vibration displacement and frequency of a speaker module 100E and a conventional speaker module according to another embodiment of the present disclosure.

Next, please refer to FIG. 17, which is a chart illustrating the relationship between vibration displacement and frequency of a speaker module 100E and a conventional speaker module according to another embodiment of the present disclosure. In FIG. 17, the curve CV04 represents the relationship between frequency and vibration displacement of the conventional speaker module, and the curve CV14 and the curve CV24 represent the relationship between frequency and vibration displacement of the speaker module 100E under different conditions.

The curve CV14 is illustrated when the weight of the second diaphragm 152 is equal to the weight of the first diaphragm 1041, and the curve CV24 is illustrated when the weight of the second diaphragm 152 is equal to the total weight of the first diaphragm 1041 and the coil 1043.

As shown in FIG. 17, the conventional speaker module has a maximum vibration displacement (for example, 0.07 mm) between the frequency of 500 Hz and 600 Hz. Furthermore, as shown in the curve CV14, the maximum vibration displacement of the speaker module 100E of this embodiment between frequency of 500 Hz and 600 Hz can be reduced to less than 0.05 mm. In addition, as shown in the curve CV24, the maximum vibration displacement of the speaker module 100E of this embodiment between frequency of 500 Hz and 600 Hz can be reduced to less than 0.045 mm.

Compared with the curve CV04, the vibration displacement of the curve CV14 between 500 Hz and 600 Hz can be effectively reduced, and the vibration displacement of the curve CV24 between 500 Hz and 600 Hz can be further reduced.

It should be noted that although the ratio of the vibration displacement reduced by the speaker module 100E is smaller than the ratio of the vibration displacement reduced by the speaker modules 100A to 100D, due to the first diaphragm 1041 and the second diaphragm 152 of the speaker module 100E not being stacked along the first axis AX1, so that the overall thickness of the speaker module 100E can be effectively reduced and can be applied to the ultra-thin notebook computer.

Figure 18:
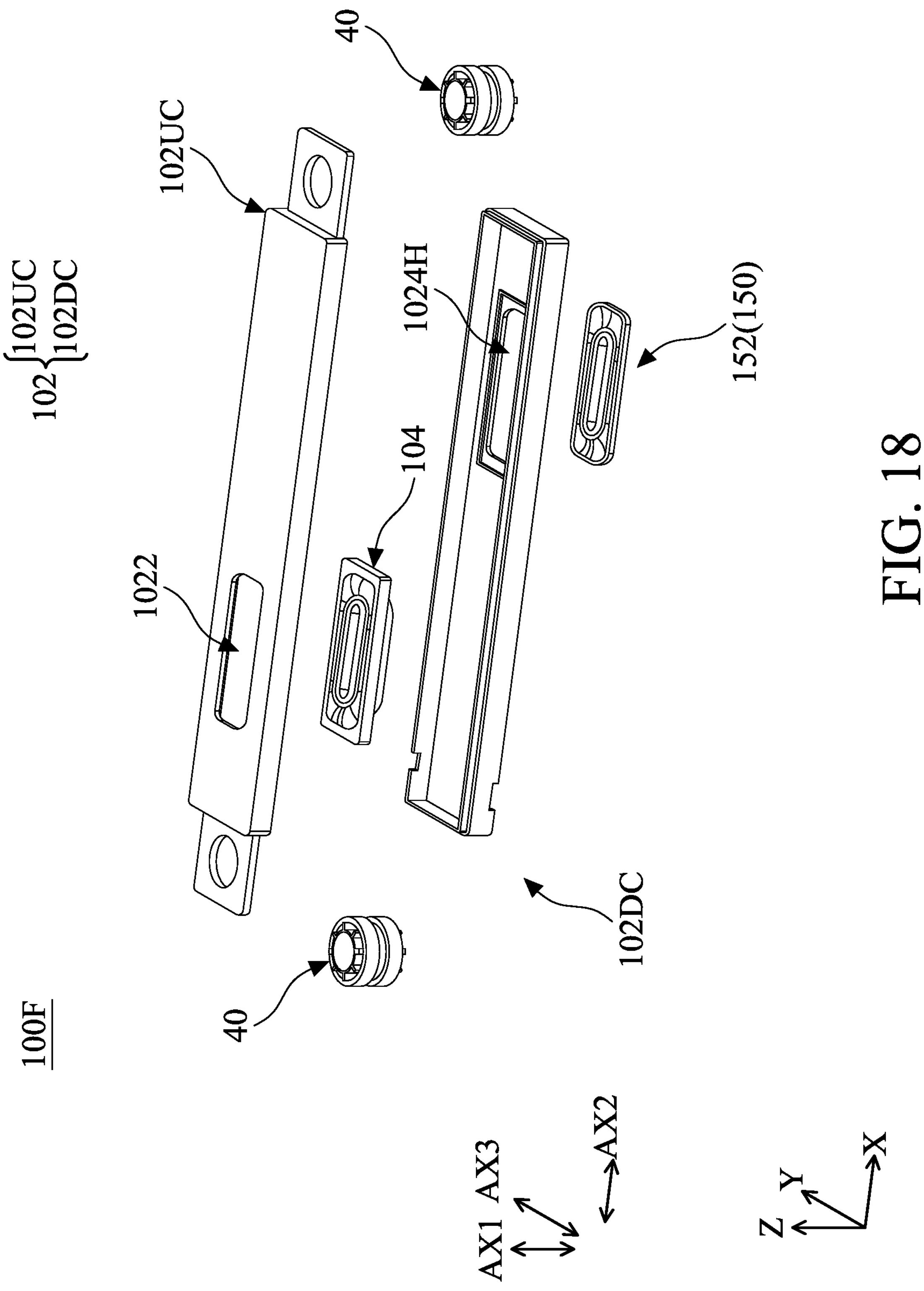
FIG. 18 is an exploded diagram of a speaker module 100F according to another embodiment of the present disclosure.
Figure 19:
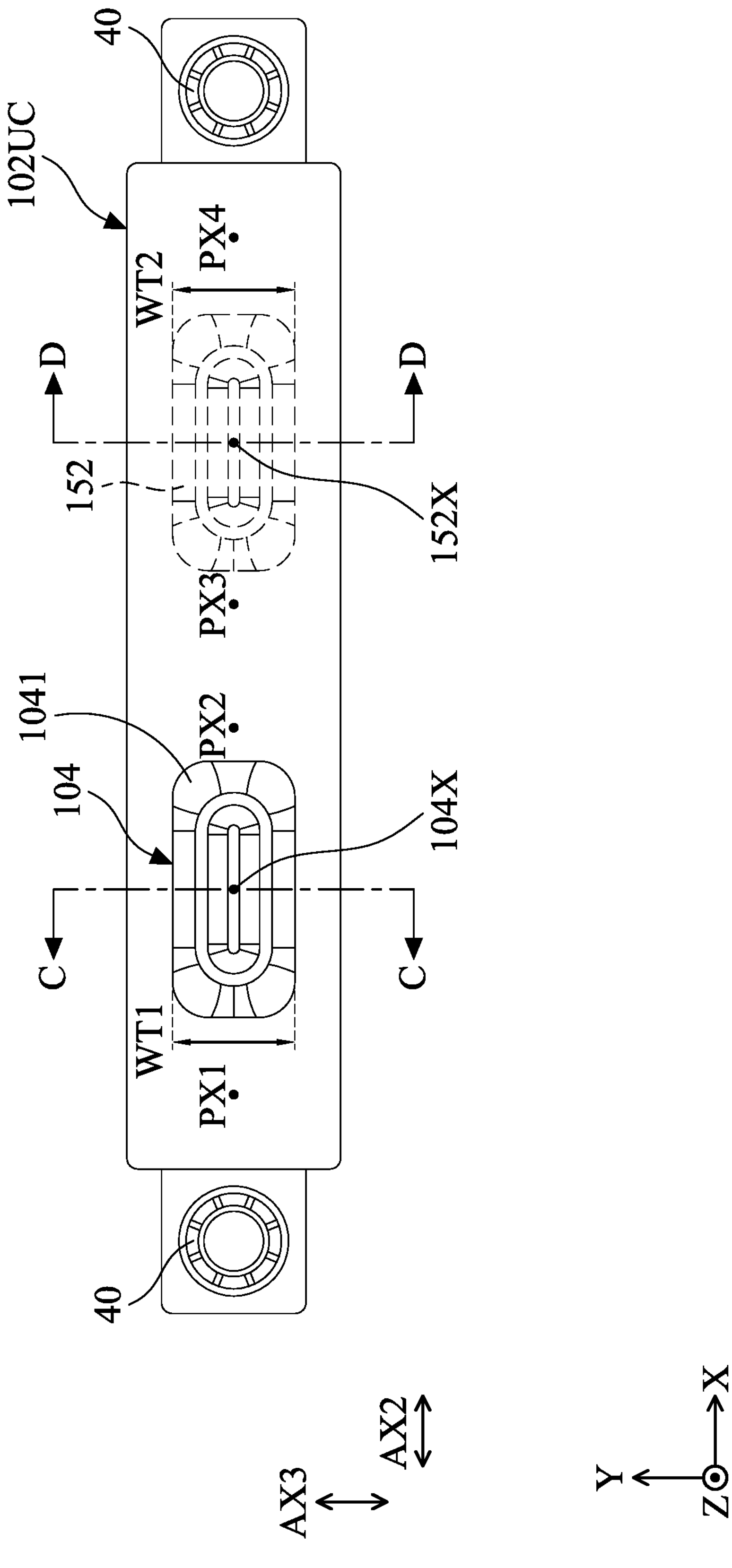
FIG. 19 is a top view of the speaker module 100F after assembly according to another embodiment of the present disclosure.
Figure 20:
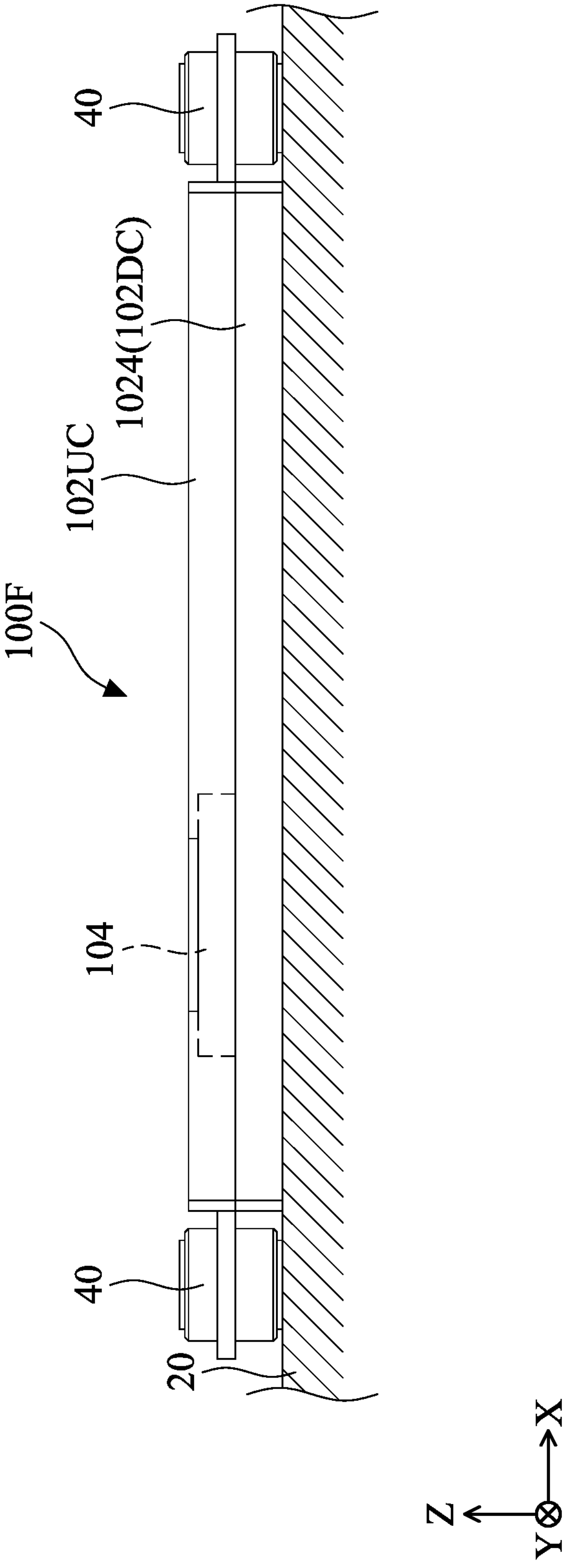
FIG. 20 is a front view of the speaker module 100F after assembly according to another embodiment of the present disclosure.

Next, please refer to FIG. 18 to FIG. 20. FIG. 18 is an exploded diagram of a speaker module 100F according to another embodiment of the present disclosure, FIG. 19 is a top view of the speaker module 100F after assembly according to another embodiment of the present disclosure, and FIG. 20 is a front view of the speaker module 100F after assembly according to another embodiment of the present disclosure. Similar to the previous embodiments, the speaker module 100F has a casing 102, a speaker unit 104 and a vibration absorber 150.

In this embodiment, the casing 102 includes an upper cover 102UC and a lower cover 102DC. The upper cover 102UC and the lower cover 102DC are arranged along the first axis AX1 and are fixedly combined together. In addition, the speaker module 100F may further include two buffer elements 40 which are fixedly connected to opposite sides of the upper cover 102UC. The buffer elements 40 may be made of rubber material, for example, but it is not limited thereto. As for the speaker unit 104, its structure is similar to the previous embodiment, so it is not described again herein.

As shown in FIG. 19, in this embodiment, when viewed along the first axis AX1, the first diaphragm 1041 and the second diaphragm 152 are arranged along the second axis AX2. Specifically, the center 104X of the first diaphragm 1041 and the center 152X of the second diaphragm 152 are arranged along the second axis AX2. The second axis AX2 is perpendicular to the first axis AX1.

In this embodiment, when viewed along the first axis AX1, the first diaphragm 1041 and the second diaphragm 152 are staggered from each other, and the first diaphragm 1041 does not overlap the second diaphragm 152. Based on this configuration, the height of the speaker module 100F in the Z-axis can be effectively reduced so as to be applied to the ultra-thin notebook computers.

In addition, as shown in FIG. 19, when viewed along the first axis AX1, a first width WT1 of the first diaphragm 1041 along the third axis AX3 is equal to a second width WT2 of the second diaphragm 152 along the third axis AX3, but it is not limited thereto.

Furthermore, similar to the previous embodiments, the speaker module 100F is disposed on the housing 20 of the electronic device 10. It is worth noting that, as shown in FIG. 20, the bottom wall 1024 of the lower cover 102DC is in direct contact with the housing 20, and the two buffer elements 40 are also in direct contact with the housing 20.

Figure 21:
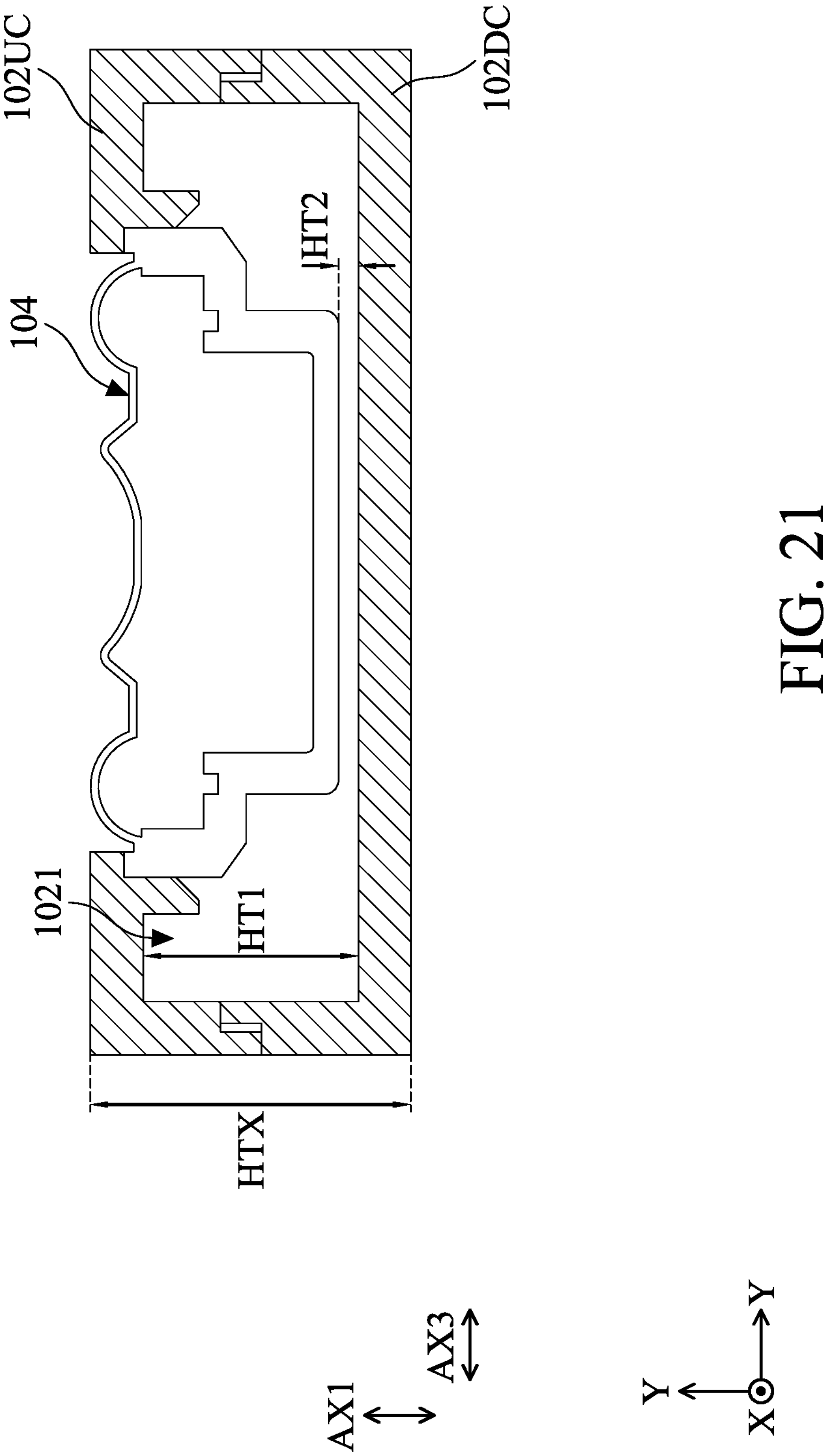
FIG. 21 is a cross-sectional view of the speaker module 100F along line C-C in FIG. 19 according to another embodiment of the present disclosure.

Next, please refer to FIG. 21, which is a cross-sectional view of the speaker module 100F along line C-C in FIG. 19 according to another embodiment of the present disclosure. As shown in FIG. 21, when viewed along the second axis AX2 (the X-axis), the sound cavity 1021 has a first height HT1, and a second height HT2 along the first axis AX1 is formed between the bottom of the speaker unit 104 and the lower cover 102DC.

The ratio of the second height HT2 to the first height HT1 is less than or equal to 1/10. For example, the first height HT1 is 4 mm, and the second height HT2 is 0.4 mm, but they are not limited thereto. Based on this configuration, the height of the speaker module 100F along the Z-axis can be further reduced without affecting the overall sound output performance.

In addition, because the first diaphragm 1041 and the second diaphragm 152 are staggered from each other, as shown in FIG. 21, the total height HTX of the casing 102 along the first axis AX1 can be effectively reduced, for example, to 6 mm.

Figure 22:
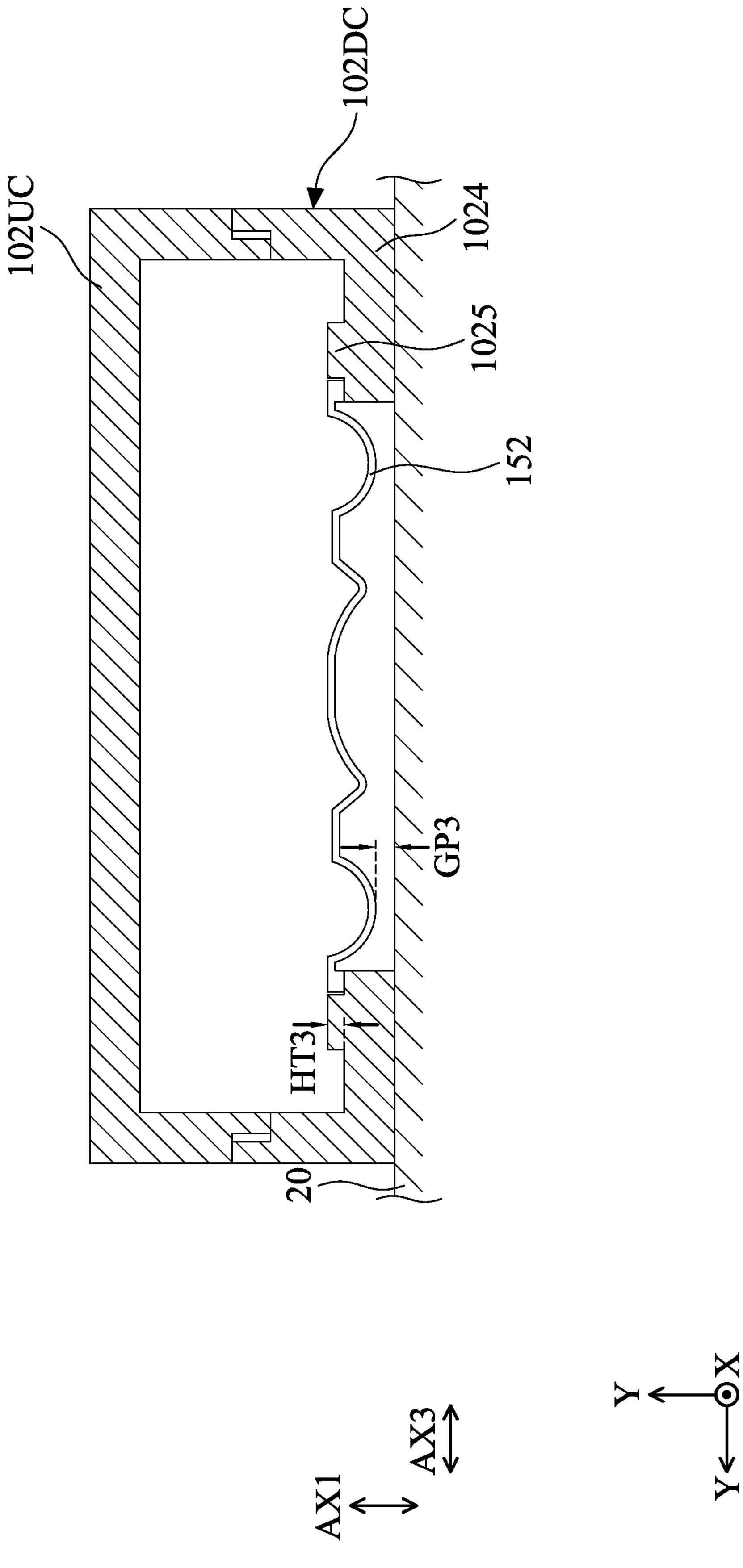
FIG. 22 is a cross-sectional view of the speaker module 100F along line D-D in FIG. 19 according to another embodiment of the present disclosure.

Next, please refer to FIG. 22, which is a cross-sectional view of the speaker module 100F along line D-D in FIG. 19 according to another embodiment of the present disclosure. As shown in FIG. 22, when viewed along the second axis AX2, the second diaphragm 152 is disposed on the bottom wall 1024 of the lower cover 102DC.

Specifically, similar to the speaker module 100A, the second diaphragm 152 is disposed on the support structure 1025 of the bottom wall 1024.

It is worth noting that a height HT3 of the support structure 1025 in this embodiment is relatively low, such as 0.4 mm. Furthermore, along the first axis AX1, there is a gap GP3 between the second diaphragm 152 and the housing 20 of the electronic device 10, and the gap GP3 ranges from 1 mm to 2 mm.

Based on the design of the gap GP3, when the second diaphragm 152 vibrates, the second diaphragm 152 is not in contact with the housing 20 so as to avoid the problem of abnormal sound caused by collision. In addition, because the gap GP3 is very small, the height of the speaker module 100F along the Z-axis can be further reduced.

Figure 23:
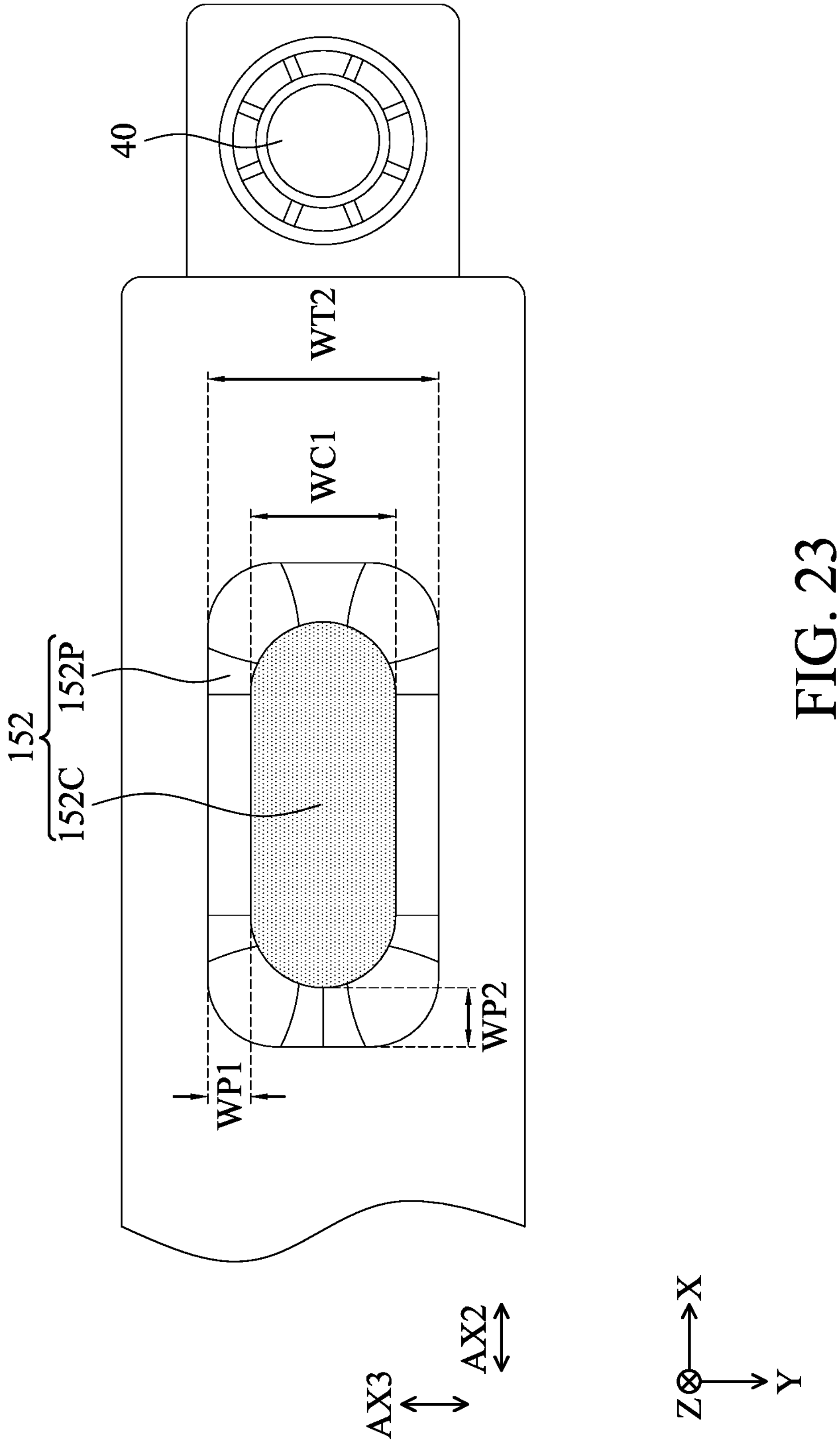
FIG. 23 is a bottom view of a partial structure of the speaker module 100F according to another embodiment of the present disclosure.

Next, please refer to FIG. 23, which is a bottom view of a partial structure of the speaker module 100F according to another embodiment of the present disclosure. In this embodiment, the second diaphragm 152 has a central portion 152C and a peripheral portion 152P, and the peripheral portion 152P is peripherally connected to the central portion 152C. Specifically, the central portion 152C and the peripheral portion 152P can be integrally formed as one piece.

It should be noted that in this embodiment, the width of the peripheral portion 152P is wider than the peripheral portion of the conventional diaphragm. For example, when viewed along the first axis AX1, the ratio of the width WC1 of the central portion 152C to the total width (the second width WT2) of the second diaphragm 152 along the third axis AX3 is less than or equal to 0.47, and the ratio of the width WP1 of the peripheral portion 152P to the total width (the second width WT2) of the second diaphragm 152 along the third axis AX3 is greater than or equal to 0.264.

Similarly, the width WP2 of the peripheral portion 152P along the second axis AX2 may be equal to the width WP1, but it is not limited thereto. Because the width of the peripheral portion 152P is greater, the ratio of the area of the peripheral portion 152P to the total area of the second diaphragm 152 is also greater, for example, greater than 0.68.

Because the peripheral portion 152P has a larger area, the elastic coefficient of the second diaphragm 152 can be reduced. Furthermore, because the area of the central portion 152C is smaller, the overall weight of the second diaphragm 152 can be reduced. Based on this design, according to the aforementioned relational (1), the resonant frequency of the second diaphragm 152 can be reduced.

For example, the resonant frequency of the second diaphragm 152 may be less than or equal to 100 Hz, and the weight of the second diaphragm 152 may be less than or equal to 1 gram. Based on this configuration, not only can the vibration absorber 150 absorb the vibration of the speaker module 100F more effectively, but it can also reduce the overall weight of the speaker module 100F so as to achieve the purpose of lightweight. For example, the weight of a conventional diaphragm with the same size is 4 grams, while the second diaphragm 152 of this embodiment can be less than 1 gram.

In addition, it should be noted that in this embodiment, the vibration absorber 150 only has the second diaphragm 152 and does not have the counterweight 154 in the previous embodiment. Therefore, the weight of the vibration absorber 150 is therefore lighter.

Figure 24:
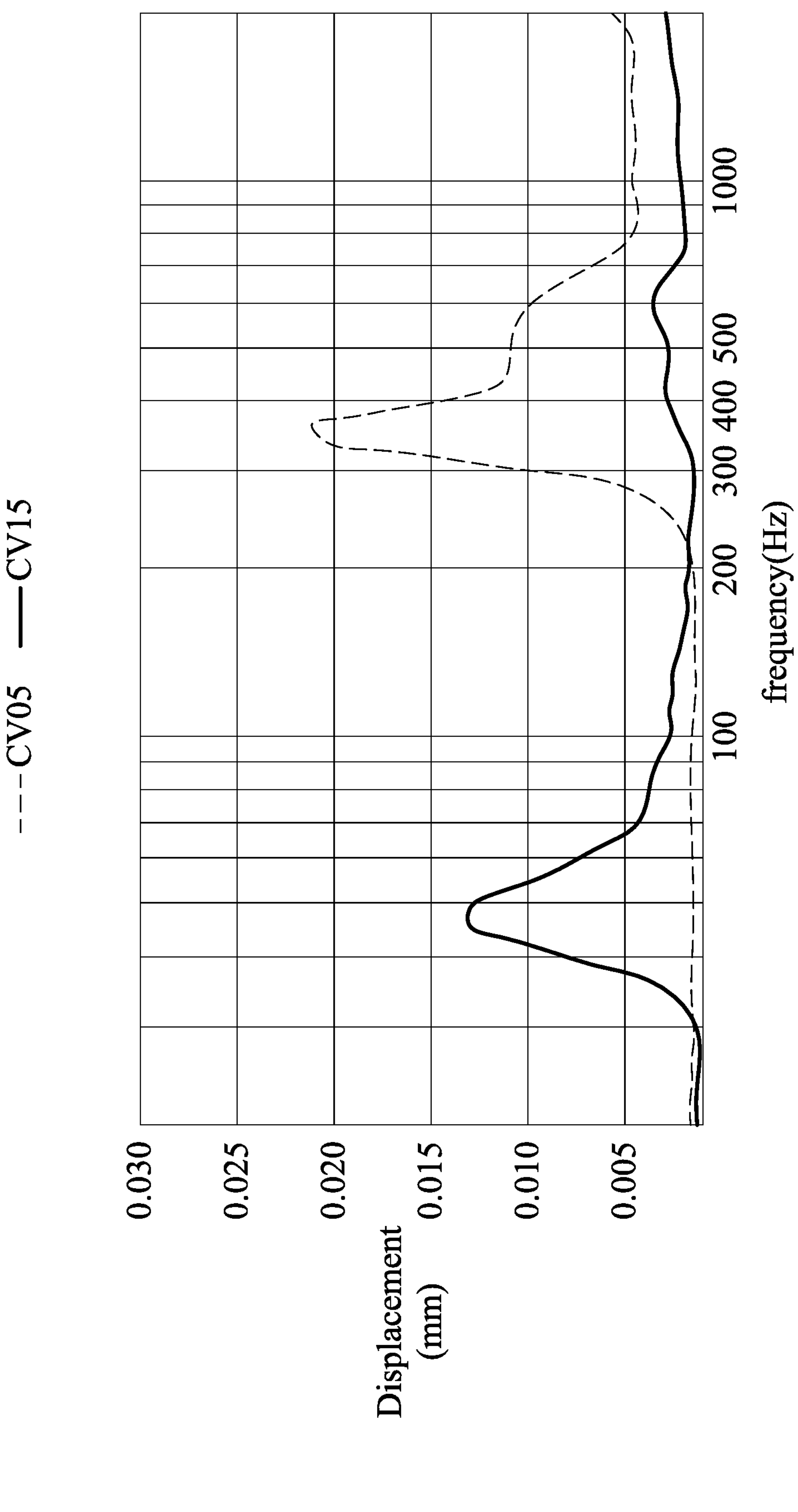
FIG. 24 is a chart illustrating the relationship between vibration displacement and frequency of the speaker module 100F and a conventional speaker module according to another embodiment of the present disclosure.
Figure 25:
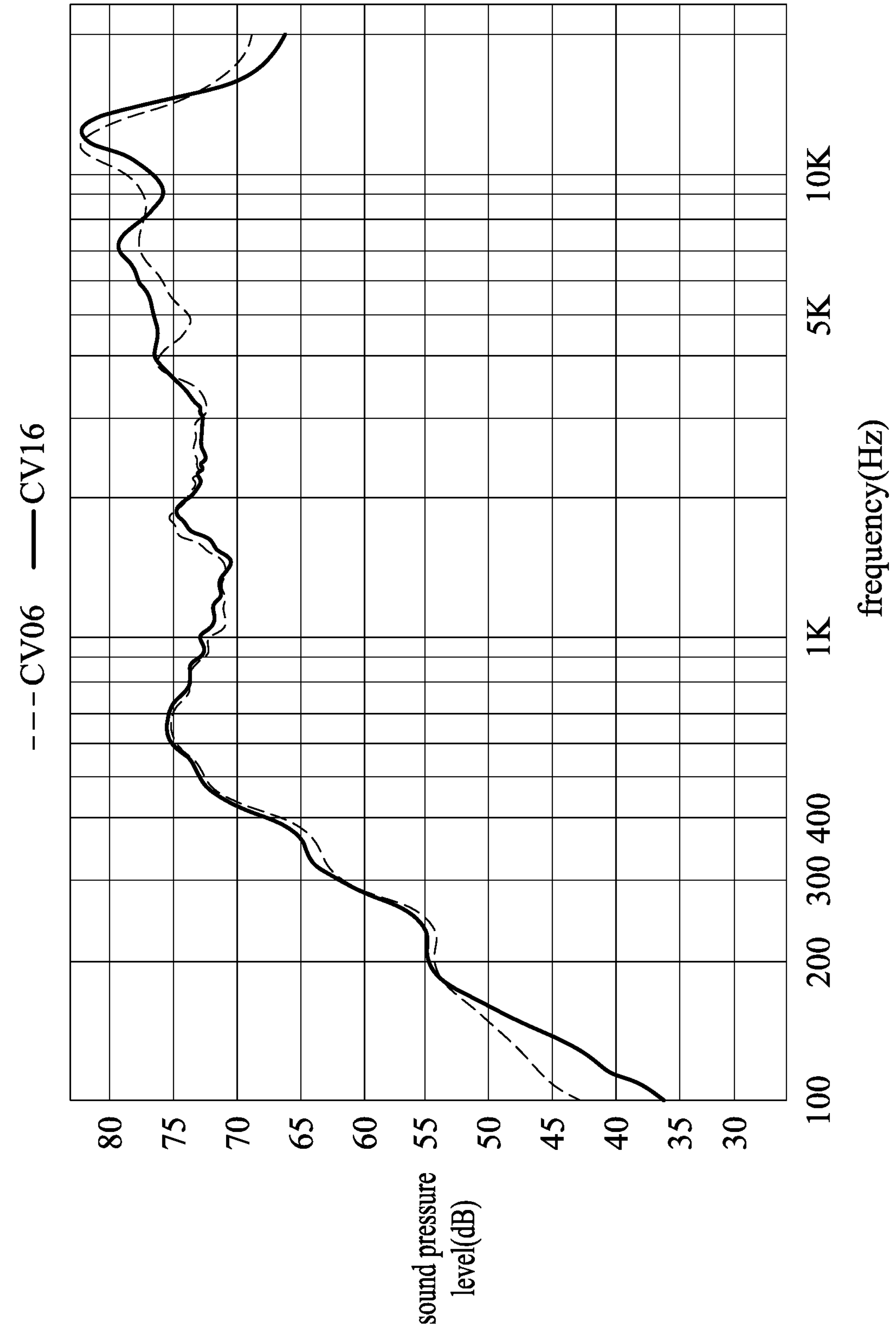
FIG. 25 is a chart illustrating the relationship between frequency and sound pressure level of the speaker module 100F and a conventional speaker module according to another embodiment of the present disclosure.
Figure 26:
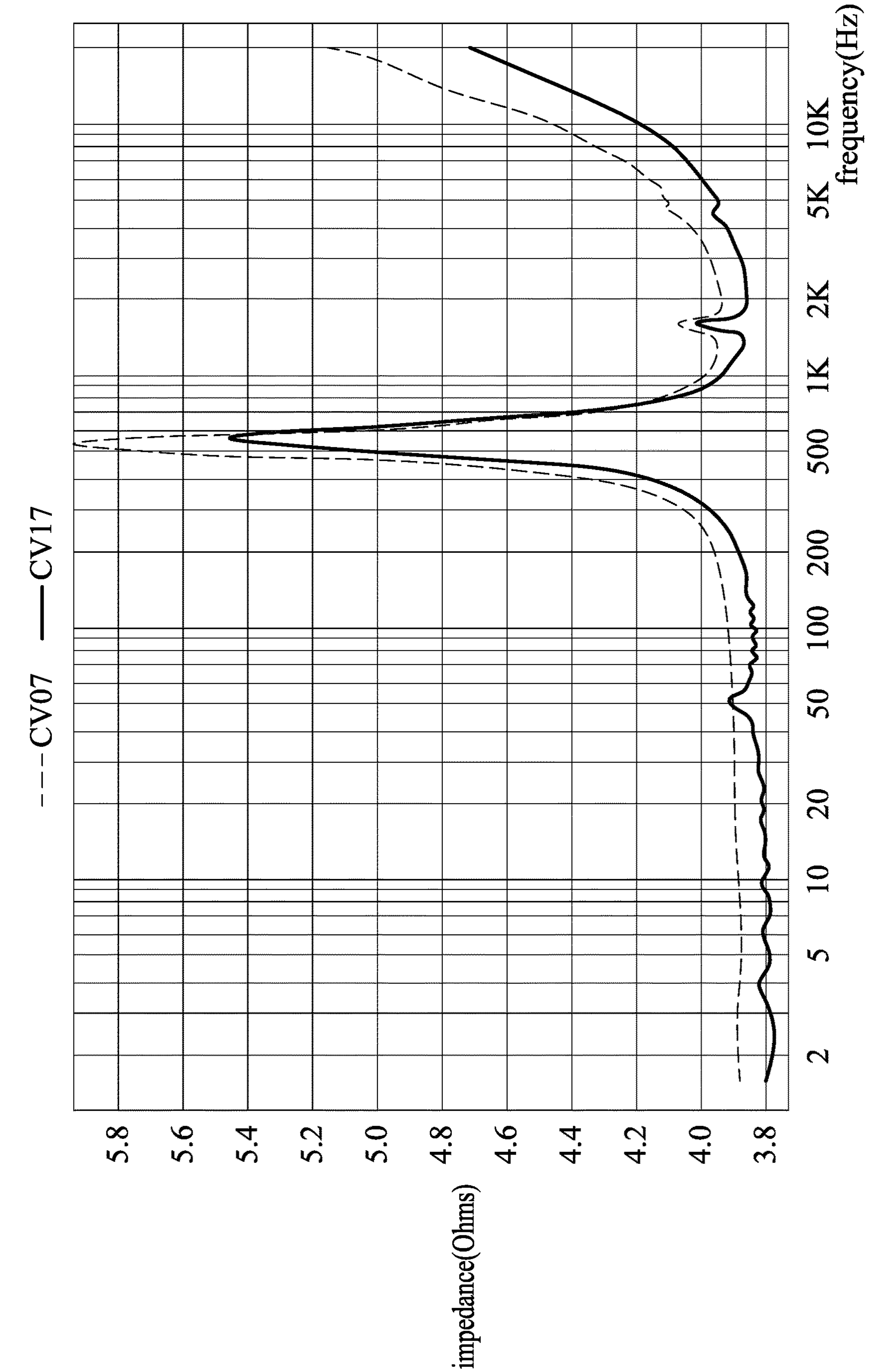
FIG. 26 is a chart illustrating the relationship between frequency and impedance of the speaker module 100F and a conventional speaker module according to another embodiment of the present disclosure.
Figure 27A:
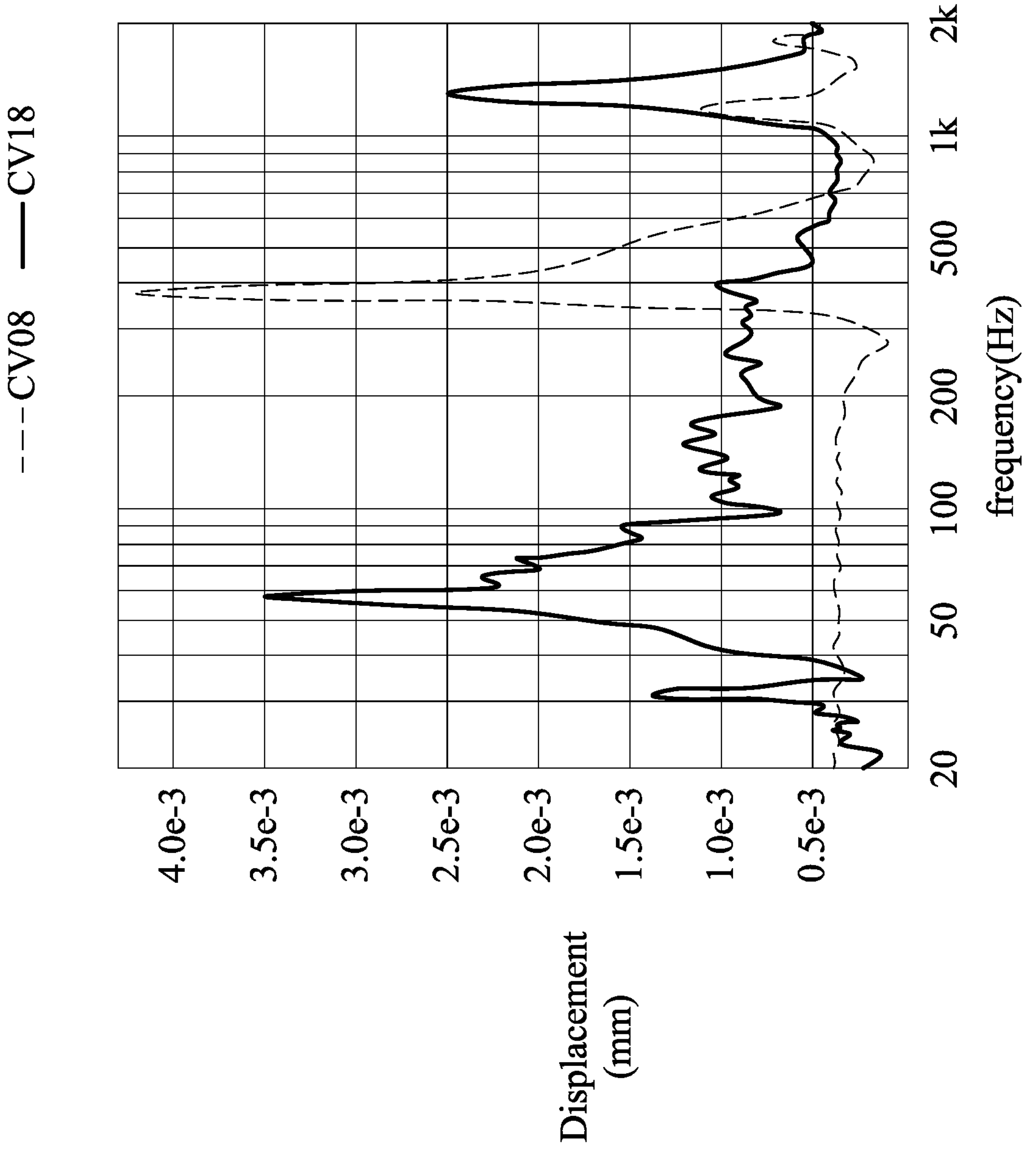
FIG. 27A to FIG. 27D are charts respectively illustrating the relationship between vibration displacement and frequency of the speaker module 100F and the conventional speaker module at different positions.
Figure 27B:
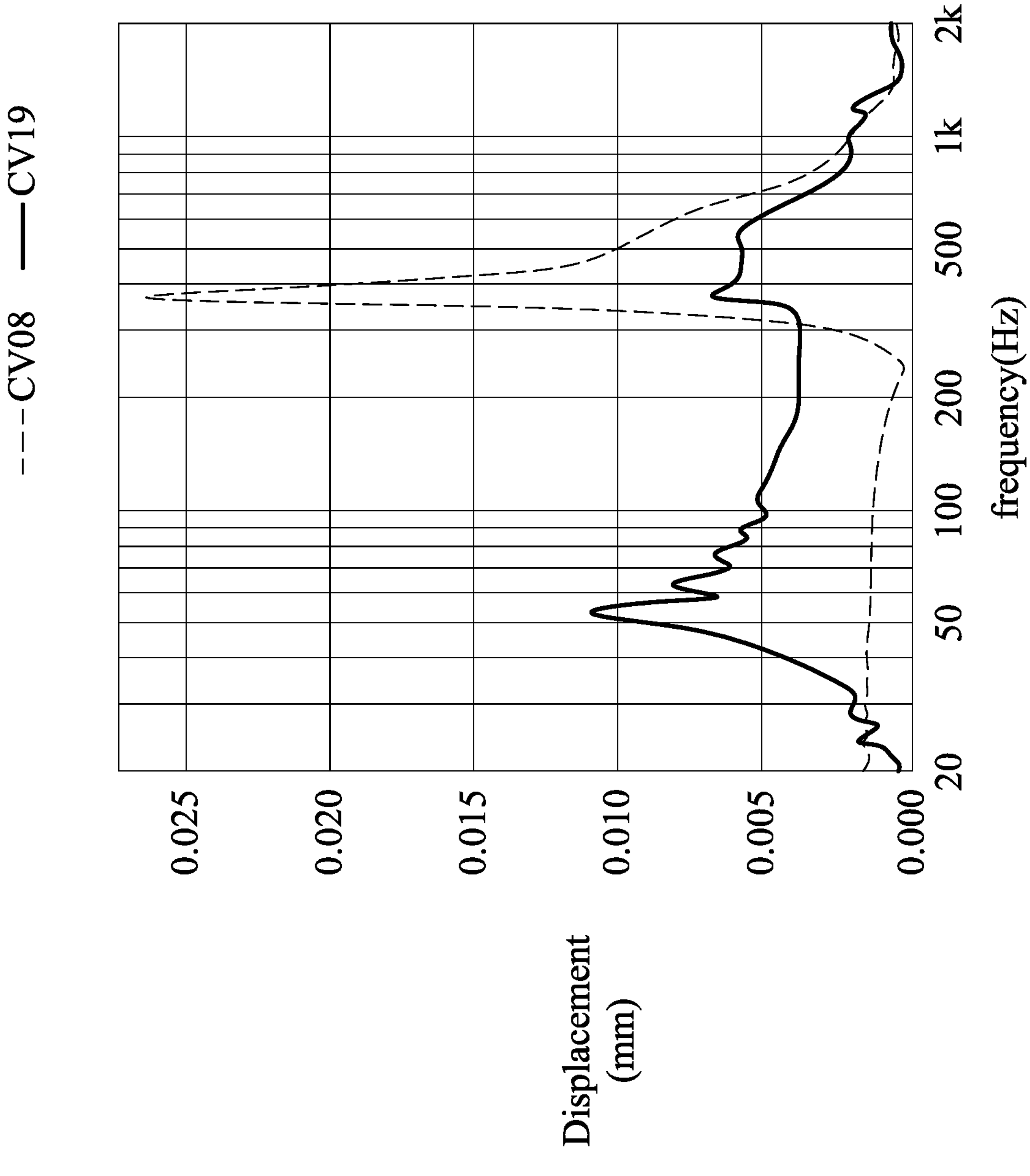
Figure 27C:
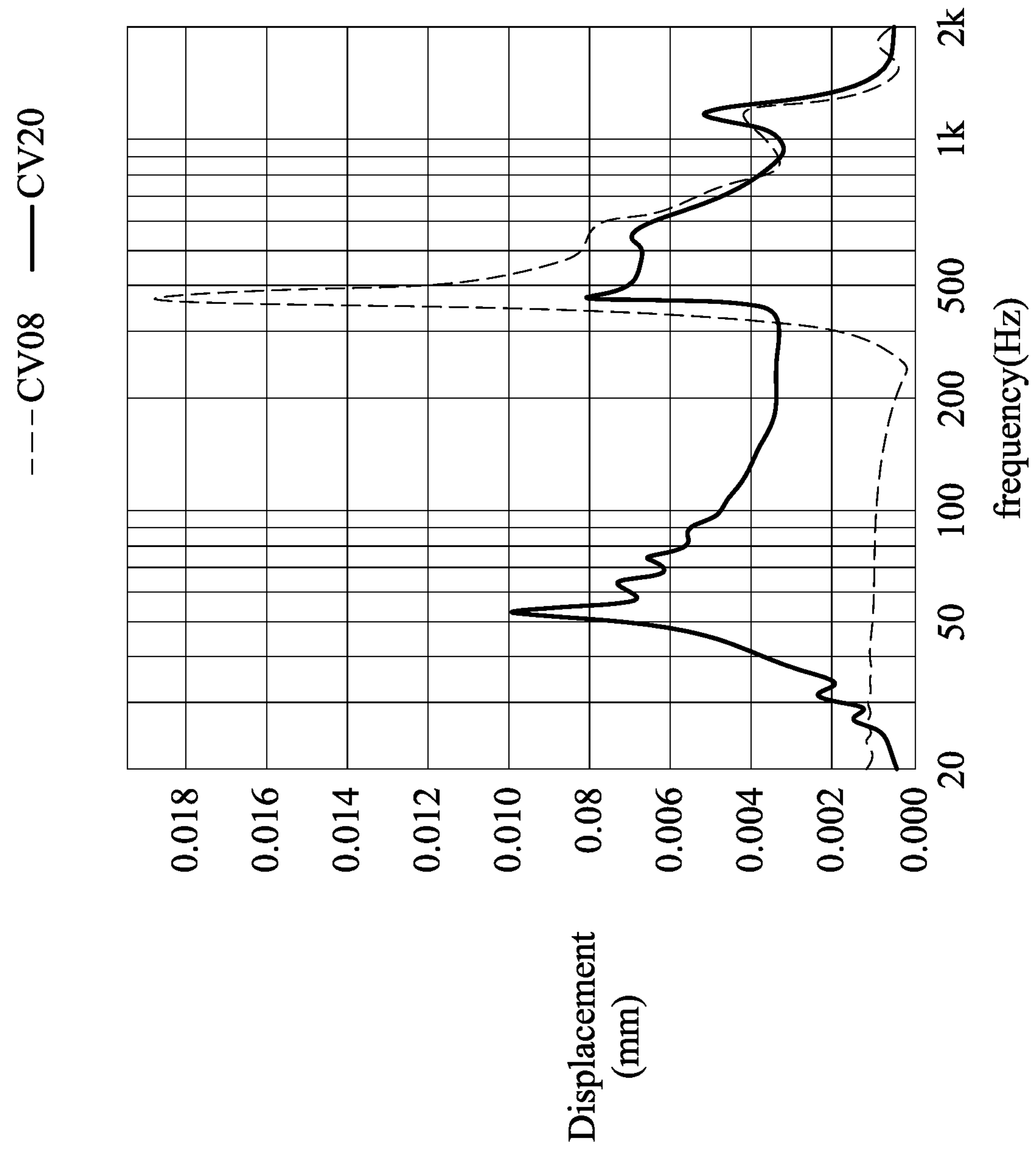
Figure 27D:
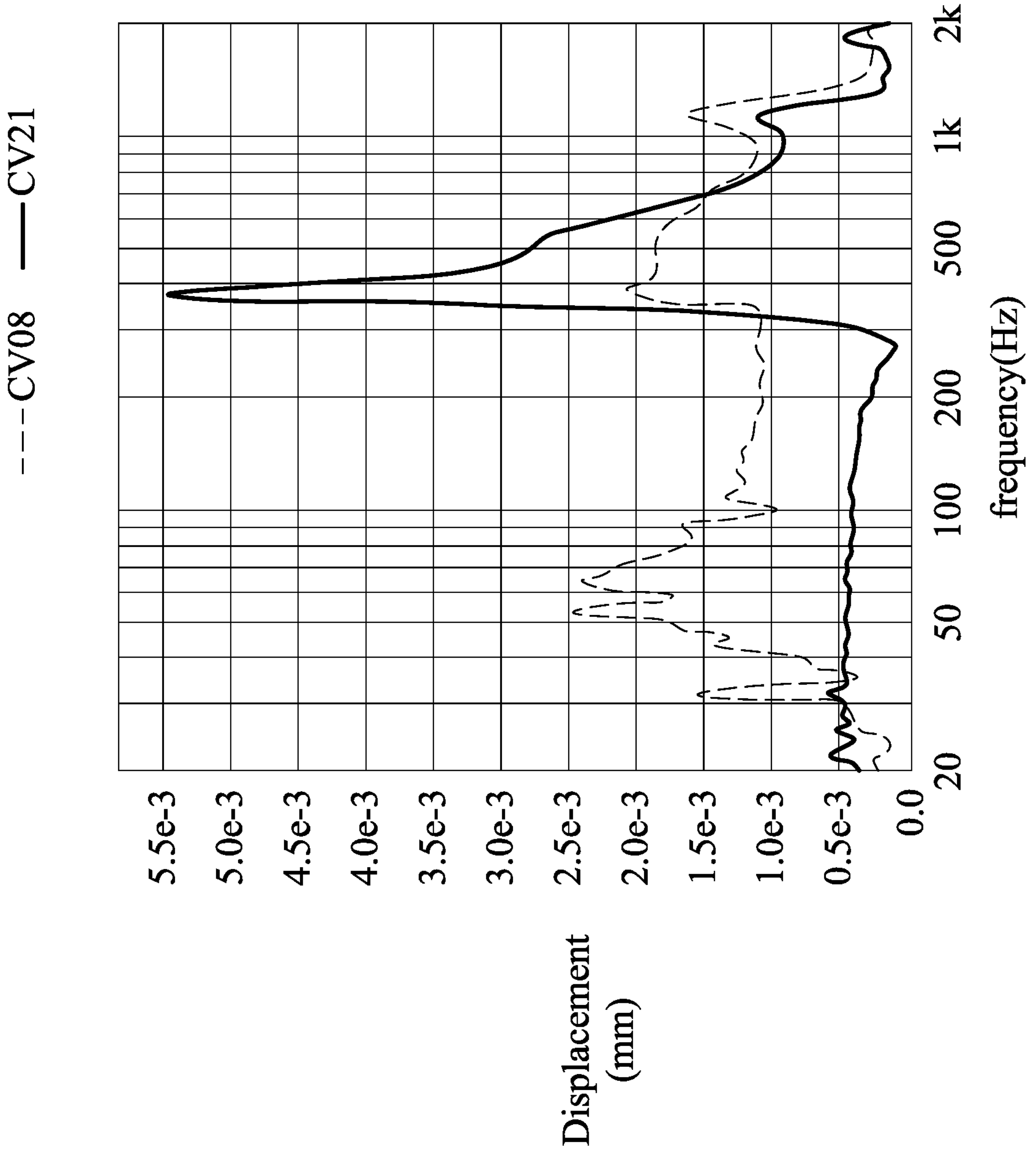

Next, please refer to FIG. 24 to FIG. 26. FIG. 24 is a chart illustrating the relationship between vibration displacement and frequency of the speaker module 100F and a conventional speaker module according to another embodiment of the present disclosure. FIG. 25 is a chart illustrating the relationship between frequency and sound pressure level of the speaker module 100F and a conventional speaker module according to another embodiment of the present disclosure. FIG. 26 is a chart illustrating the relationship between frequency and impedance of the speaker module 100F and a conventional speaker module according to another embodiment of the present disclosure.

As shown in FIG. 24, the curve CV05 represents the relationship between frequency and vibration displacement of the conventional speaker module, and the curve CV15 represents the relationship between the frequency and vibration displacement of the speaker module 100F.

As shown in the curve CV05 in FIG. 24, the conventional speaker module without the vibration absorber 150 has the maximum vibration displacement between the frequency of 300 Hz and 500 Hz. This vibration displacement causes the electronic device 10 to generate unnecessary noise, affecting the user's experience.

As shown in the curve CV15, after adding the vibration absorber 150, the vibration displacement of the speaker module 100F can be effectively reduced. The maximum vibration displacement of the speaker module 100F between 300 Hz and 500 Hz in this embodiment can be reduced to less than 0.003 mm. In other words, the vibration absorber 150 can absorb at least 80% of vibration so as to achieve better vibration absorption effect.

Furthermore, in FIG. 25, the curve CV06 represents the sound pressure level curve of the conventional speaker module at different frequencies, and the curve CV16 represents the sound pressure level curve at different frequencies of the speaker module 100F of the present disclosure. As shown in FIG. 26, when the frequency is above 300 Hz, the sound pressure level (SPL) of the curve CV06 and the curve CV16 has little difference (less than 5%).

Next, in FIG. 26, the curve CV07 represents the impedance curve of the conventional speaker module at different frequencies, and the curve CV17 represents the impedance curve of the speaker module 100F of the present disclosure at different frequencies. As shown in FIG. 26, the waveform of the curve CV07 is not much different from the waveform of the curve CV17. As shown in FIG. 25 and FIG. 26, after adding the vibration absorber 150, the output performance of the speaker module 100F is not greatly affected.

In addition, it should be noted that in other embodiments, the first width WT1 of the first diaphragm 1041 along the third axis AX3 may be greater than the second width WT2 of the second diaphragm 152 along the third axis AX3. That is, the size of the second diaphragm 152 can be smaller than or equal to the size of the first diaphragm 1041, and the second diaphragm 152 can still effectively absorb the overall vibration of the speaker module 100F.

Next, please refer to FIG. 27A to FIG. 27D. FIG. 27A to FIG. 27D are charts respectively illustrating the relationship between vibration displacement and frequency of the speaker module 100F and the conventional speaker module at different positions. In these figures, the curve CV08 represents the relationship between frequency and vibration displacement of the conventional speaker module, the curve CV18 represents the relationship between frequency and vibration displacement at the position PX1 in FIG. 19, the curve CV19 represents the relationship between frequency and vibration displacement at position PX2 in FIG. 19, the curve CV20 represents the relationship between the frequency and vibration displacement at position PX3 in FIG. 19, and the curve CV21 represents the relationship between the frequency and vibration displacement at position PX4 in FIG. 19.

As shown in FIG. 27A to FIG. 27D, after adding the vibration absorber 150, the vibration displacement at different positions on the speaker module 100F can be effectively absorbed, so that the noise caused by the vibration can be effectively avoided.

Figure 28:
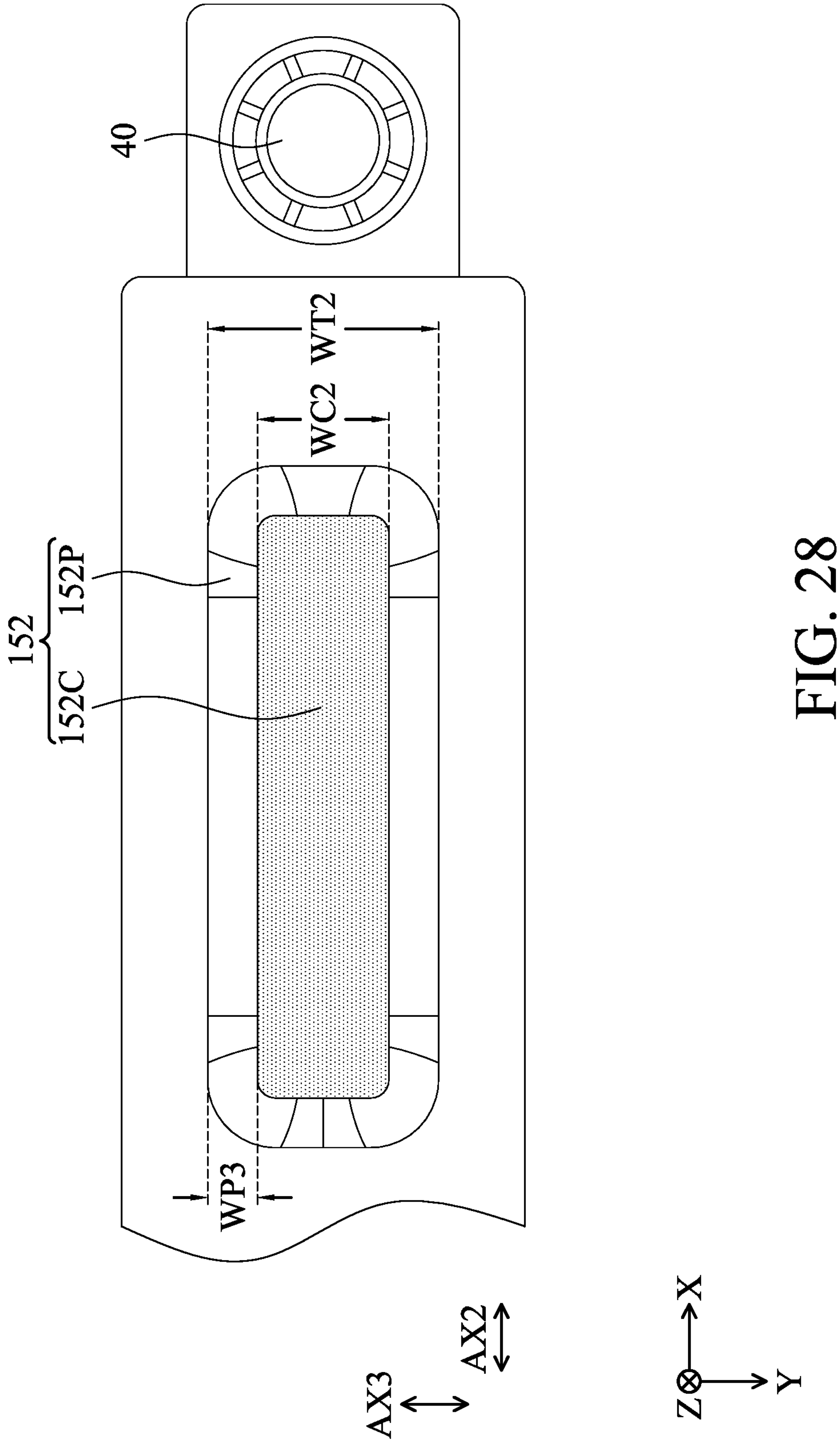
FIG. 28 is a bottom view of a partial structure of a speaker module 100G according to another embodiment of the present disclosure.
Figure 29A:
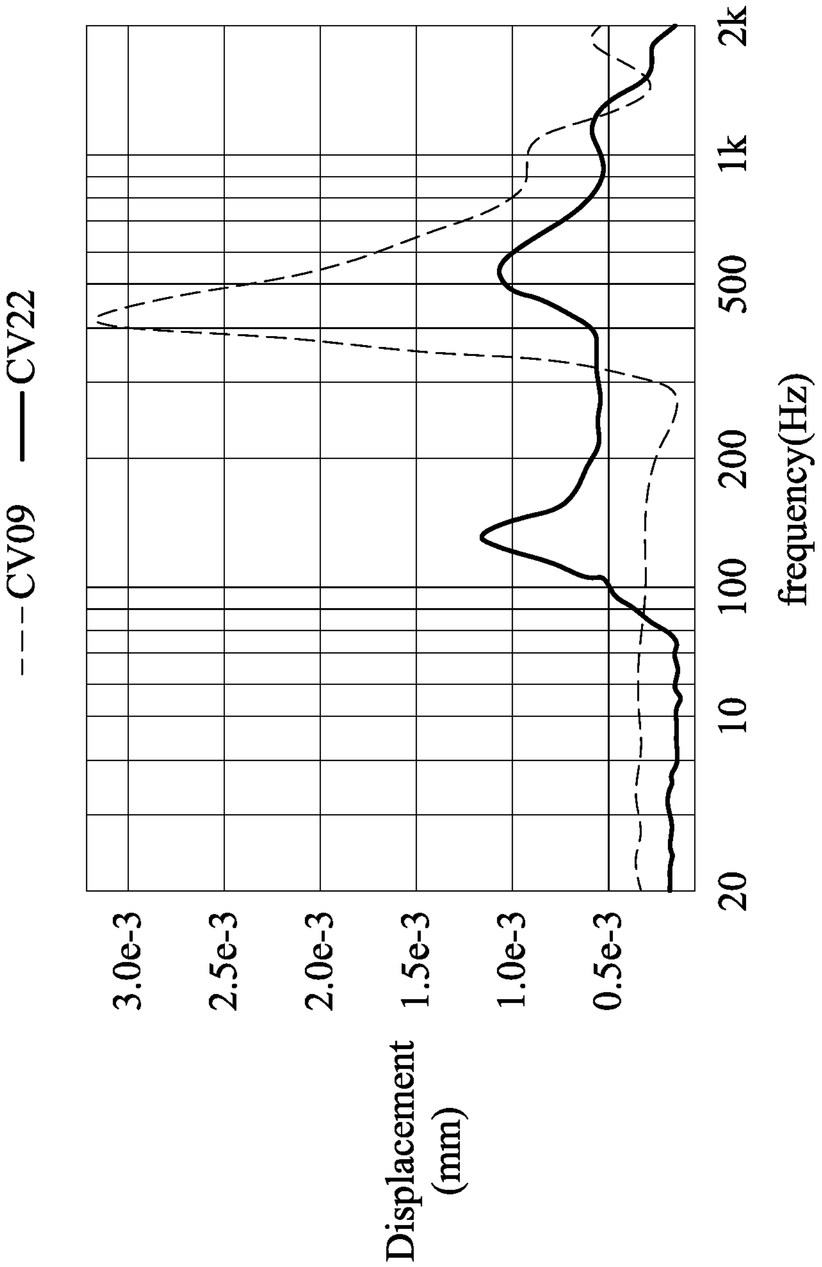
FIG. 29A to FIG. 29D are charts respectively illustrating the relationship between vibration displacement and frequency of the speaker module 100G and the conventional speaker module at different positions.
Figure 29B:
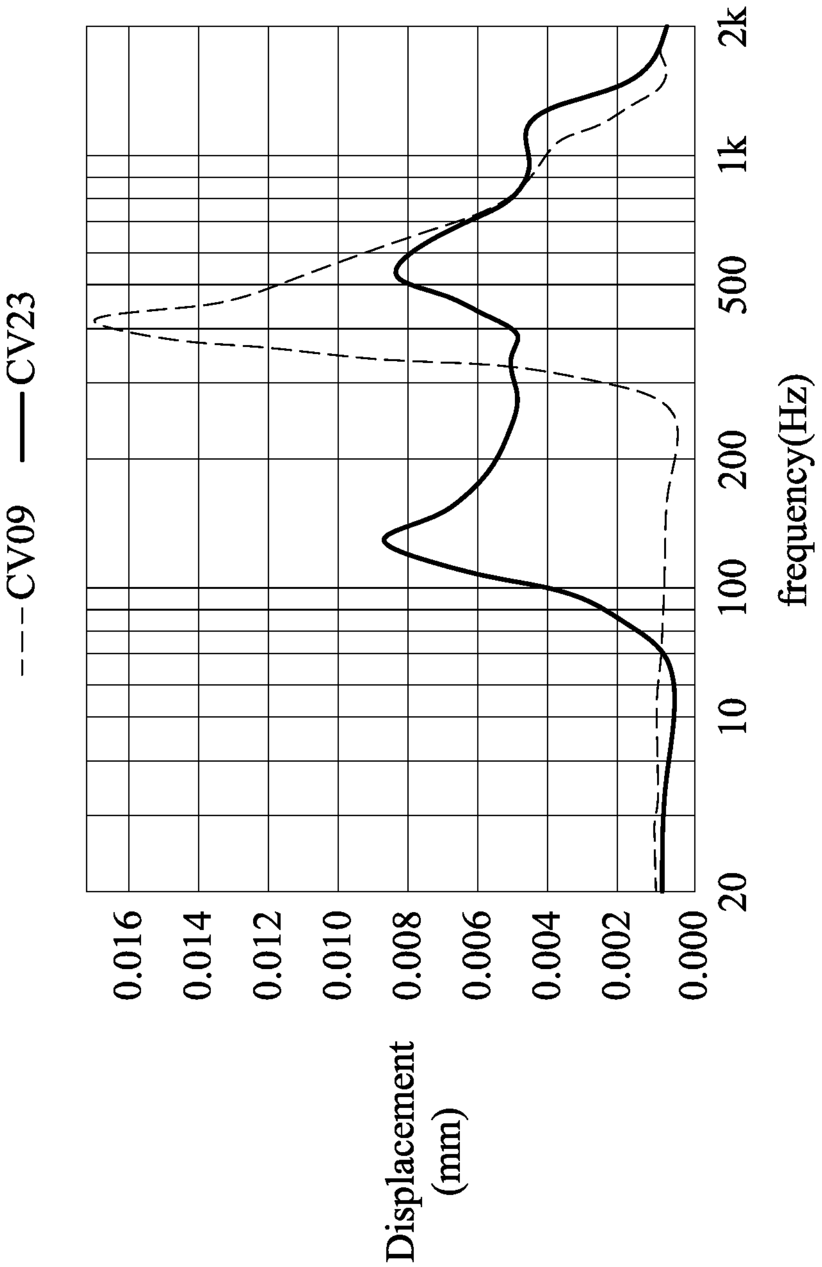
Figure 29C:
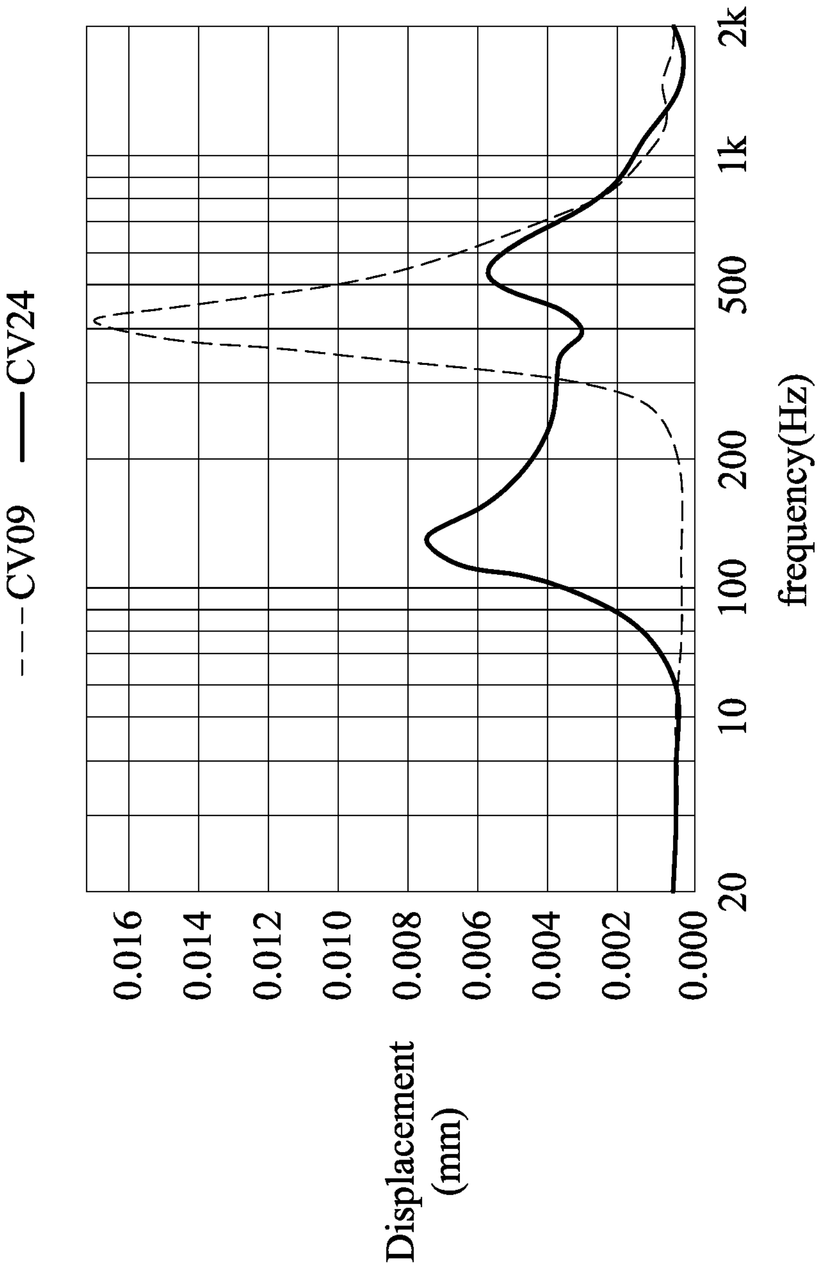
Figure 29D:
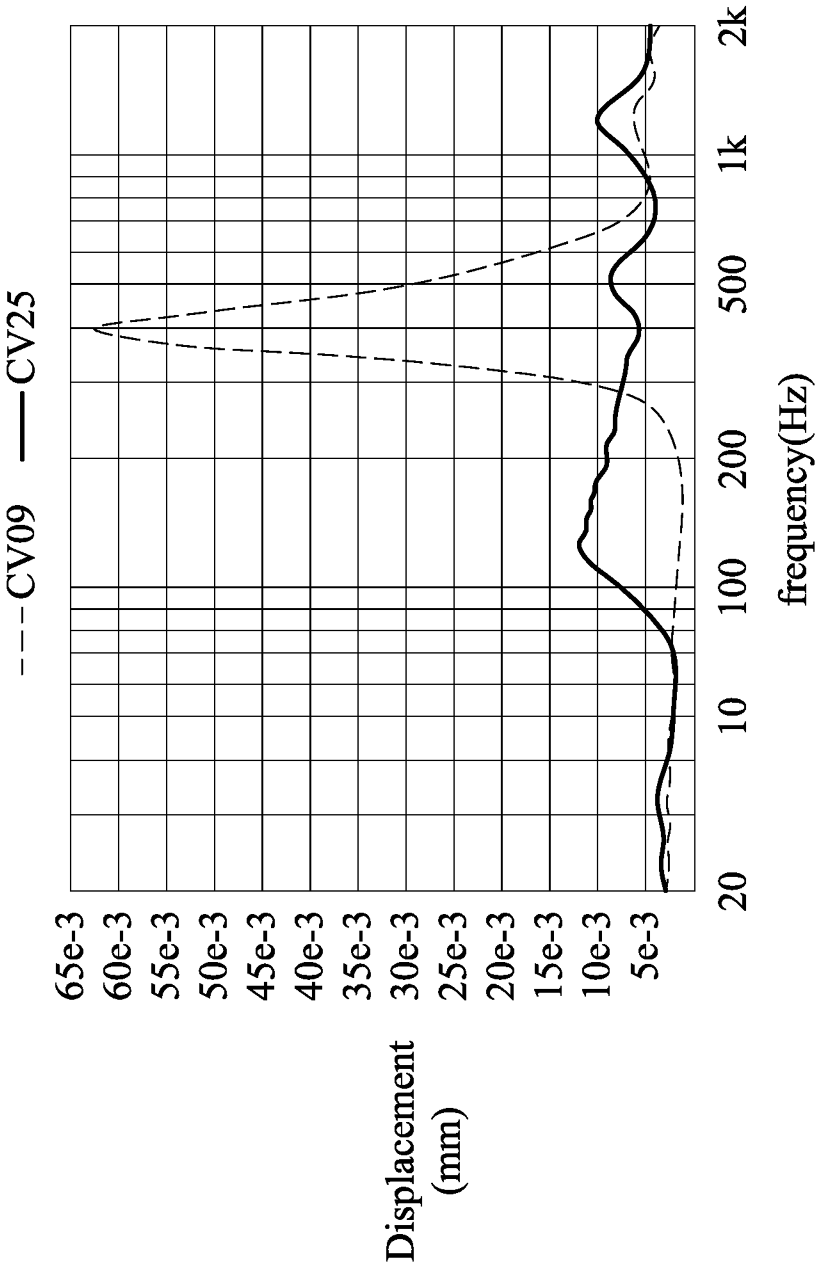

Next, please refer to FIG. 28, which is a bottom view of a partial structure of a speaker module 100G according to another embodiment of the present disclosure. Similar to the speaker module 100F, the second diaphragm 152 of the speaker module 100G also has a central portion 152C and a peripheral portion 152P, and the peripheral portion 152P is peripherally connected to the central portion 152C.

It should be noted that in this embodiment, the width of the central portion 152C can be the same as the width of the central portion of the conventional diaphragm, and the width of the peripheral portion 152P is greater than the width of the peripheral portion of the conventional diaphragm. For example, the width of the conventional peripheral portion along the second axis AX2 is 1 mm, while the width WP3 of the peripheral portion 152P of this embodiment along the second axis AX2 may be 2 mm~2.5 mm.

As shown in FIG. 28, when viewed along the first axis AX1, the ratio of the width WC2 of the central portion 152C to the total width (the second width WT2) of the second diaphragm 152 along the third axis AX3 is less than or equal to 0.5, and the ratio of the width WP3 of the peripheral portion 152P to the total width (the second width WT2) of the second diaphragm 152 along the third axis AX3 is greater than or equal to 0.25.

Similarly, based on the larger width design of the peripheral portion 152P, the resonant frequency of the second diaphragm 152 can also be less than or equal to 100 Hz, and the weight of the second diaphragm 152 can be less than or equal to 1 gram, so that the vibration absorber 150 can absorb the vibration of the speaker module 100G more effectively, and can also reduce the overall weight of the speaker module 100G so as to achieve the purpose of lightweighting.

Next, please refer to FIG. 29A to FIG. 29D, and FIG. 29A to FIG. 29D are charts respectively illustrating the relationship between vibration displacement and frequency of the speaker module 100G and the conventional speaker module at different positions. In these figures, the curve CV09 represents the relationship between frequency and vibration displacement of the conventional speaker module. The curve CV22, curve CV23, curve CV24 and curve CV25 respectively represent the relationship between frequency and vibration at the positions PX1, PX2, PX3 and PX4 on the upper cover 102UC.

As shown in FIG. 29A to FIG. 29D, after adding the vibration absorber 150, the vibration displacement at different positions on the speaker module 100G can be effectively absorbed, so that the abnormal noise caused by vibration can be effectively avoided.

In summary, the present disclosure provides a speaker module, including a casing 102, a speaker unit 104 and a vibration absorber 150. The speaker unit 104 is disposed on the casing 102 and has a first diaphragm 1041. The vibration absorber 150 is disposed on the casing 102, and the vibration absorber 150 has a second diaphragm 152. When the first diaphragm 1041 vibrates, the air flow generated by the first diaphragm 1041 drives the second diaphragm 152 to vibrate, and the vibration direction of the second diaphragm 152 can be opposite to the vibration direction of the first diaphragm

1041, thereby absorbing the vibration generated by the first diaphragm 1041 onto the casing 102.

In some embodiments, the sound outlet 1022, the first diaphragm 1041 and the second diaphragm 152 are arranged along the first axis AX1, and the texture, shape, elastic coefficient and weight of the second diaphragm 152 may be equal to the texture, shape, elastic coefficient and weight of the first diaphragm 1041. In some embodiments, the vibration absorber 150 may further have a counterweight 154 affixed to the bottom of the second diaphragm 152, and the total weight of the counterweight 154 and the second diaphragm 152 may be equal to the total weight of the first diaphragm 1041 and the coil 1043. Based on the design of the vibration absorber 150 of multiple embodiments of the present disclosure, the overall vibration of the speaker module can be effectively reduced without affecting the output effect of the speaker module.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A speaker module, comprising:

a casing, having a sound cavity;

a speaker unit, disposed on the casing, wherein the speaker unit includes a first diaphragm; and a vibration absorber, disposed in the casing, wherein the vibration absorber has a second diaphragm;

wherein when the first diaphragm vibrates, airflow generated by the first diaphragm drives the second diaphragm to vibrate, and a vibration direction of the second diaphragm is opposite to a vibration direction of the first diaphragm, so as to absorb the vibration generated by the first diaphragm to the casing;

wherein the first diaphragm and the second diaphragm are arranged along a first axis, and when viewed along the first axis, the first diaphragm overlaps the second diaphragm;

wherein the casing further includes a support structure and a bottom wall, the support structure is fixedly connected to the bottom wall, and the second diaphragm is movably connected to the support structure, wherein the support structure, the second diaphragm and the bottom wall form a chamber, and the chamber and the sound cavity do not communicate with each other.

2. The speaker module as claimed in claim 1, wherein at least one opening is formed on the bottom wall, the at least one opening corresponds to the second diaphragm, and when viewed along the first axis, the at least one opening overlaps the first diaphragm and the second diaphragm;

wherein when viewed along the first axis, the at least one opening is formed by the support structure.

3. The speaker module as claimed in claim 1, wherein when viewed along a second axis perpendicular to the first axis, a distance between the second diaphragm and the bottom wall along the first axis is greater than or equal to 2 mm.

4. The speaker module as claimed in claim 1, wherein a bottom opening is formed on the bottom wall of the casing, and the second diaphragm is disposed in the bottom opening;

wherein when viewed along a second axis perpendicular to the first axis, a portion of the second diaphragm overlaps the bottom wall;

wherein the vibration absorber further includes a counterweight fixedly connected to a bottom of the second diaphragm, and when viewed along the second axis, a portion of the counterweight overlaps the bottom wall.

5. The speaker module as claimed in claim 1, wherein a texture, a shape and an elastic coefficient of the second diaphragm are equal to a texture, a shape and an elastic coefficient of the first diaphragm;

wherein the vibration absorber further includes a counterweight fixedly connected to the second diaphragm, and the speaker unit further includes a coil configured to drive the first diaphragm, wherein a total weight of the counterweight and the second diaphragm is equal to a total weight of the first diaphragm and the coil.

6. A speaker module, comprising:

a casing, having a sound cavity;

a speaker unit, disposed on the casing, wherein the speaker unit includes a first diaphragm; and a vibration absorber, disposed in the casing, wherein the vibration absorber has a second diaphragm;

wherein when the first diaphragm vibrates, airflow generated by the first diaphragm drives the second diaphragm to vibrate, and a vibration direction of the second diaphragm is opposite to a vibration direction of the first diaphragm, so as to absorb the vibration generated by the first diaphragm to the casing;

wherein the speaker unit further includes a coil configured to drive the first diaphragm, the first diaphragm and the coil are arranged along a first axis, the first diaphragm and the second diaphragm are arranged along a second axis, and the first axis is perpendicular to the second axis, wherein when viewed along the first axis, the first diaphragm does not overlap the second diaphragm;

wherein the casing includes a top wall and a covering member, the speaker unit is disposed on the top wall, and the covering member is fixedly connected to the top wall, wherein when viewed along the first axis, the covering member completely covers the second diaphragm;

wherein a texture, a shape, and an elastic coefficient of the second diaphragm are equal to a texture, a shape, and an elastic coefficient of the first diaphragm.

7. The speaker module as claimed in claim 6, wherein when viewed along the first axis, the covering member covers half of the first diaphragm;

wherein the covering member and the top wall form a sound channel which is connected to the second diaphragm;

wherein the sound channel and the sound cavity communicate with each other.

8. The speaker module as claimed in claim 6, wherein when viewed along a third axis, an end of the covering member forms a guiding structure, and the third axis is perpendicular to the first axis and the second axis;

wherein when viewed along the third axis, the guiding structure has a triangular structure, a bevel structure or an arc structure.

9. A speaker module, comprising:

a casing, having a sound cavity;

a speaker unit, disposed on the casing, wherein the speaker unit includes a first diaphragm; and a vibration absorber, disposed in the casing, wherein the vibration absorber has a second diaphragm;

wherein when the first diaphragm vibrates, airflow generated by the first diaphragm drives the second diaphragm to vibrate, and a vibration direction of the second diaphragm is opposite to a vibration direction of the first diaphragm, so as to absorb the vibration generated by the first diaphragm to the casing;

wherein the casing includes a upper cover and a lower cover, the upper cover and the lower cover are arranged along a first axis, wherein when viewed along the first axis, the first diaphragm and the second diaphragm are staggered from each other, and the first diaphragm does not overlap the second diaphragm.

10. The speaker module as claimed in claim 9, wherein the speaker module is disposed on a housing of an electronic device, and a bottom wall of the lower cover is in direct contact with the housing.

11. The speaker module as claimed in claim 10, wherein the speaker module further includes two buffer elements which are fixedly connected to opposite sides of the casing, and the two buffer elements are in direct contact with the housing.

12. The speaker module as claimed in claim 9, wherein when viewed along a second axis, the sound cavity has a first height, and a second height is formed between a bottom of the speaker unit and the lower cover along the first axis, wherein the ratio of the second height to the first height is less than or equal to 1/10, and the first axis is perpendicular to the second axis.

13. The speaker module as claimed in claim 12, wherein when viewed along the second axis, the second diaphragm is disposed on a bottom wall of the lower cover, and along the first axis, there is a gap between the second diaphragm and a housing of an electronic device, and the gap ranges from 1 mm to 2 mm.

14. The speaker module as claimed in claim 9, wherein when viewed along the first axis, the first diaphragm and the second diaphragm are arranged along a second axis, and a first width of the first diaphragm along a third axis is greater than or equal to a second width of the second diaphragm along the third axis, wherein the first axis, the second axis and the third axis are perpendicular to each other.

15. The speaker module as claimed in claim 9, wherein a resonant frequency of the second diaphragm is less than or equal to 100 Hz, and a weight of the second diaphragm is less than or equal to 1 gram.

16. The speaker module as claimed in claim 9, wherein the second diaphragm has a central portion and a peripheral portion, the peripheral portion is circumferentially connected to the central portion, wherein when viewed along the first axis, a ratio of the width of the central portion to a total width of the second diaphragm along a third axis is less than or equal to 0.47, and a ratio of the width of the peripheral portion to the total width of the second diaphragm along the third axis is greater than or equal to 0.264, wherein the third axis is perpendicular to the first axis.

17. The speaker module as claimed in claim 9, wherein the second diaphragm has a central portion and a peripheral portion, the peripheral portion is circumferentially connected to the central portion, wherein when viewed along the first axis, a ratio of the width of the central portion to a total width of the second diaphragm along a third axis is less than or equal to 0.5, and a ratio of the width of the peripheral portion to the total width of the second diaphragm along the third axis is greater than or equal to 0.25, wherein the third axis is perpendicular to the first axis.

18. The speaker module as claimed in claim 9, wherein a center of the first diaphragm and a center of the second diaphragm are arranged along a second axis, and the second axis is perpendicular to the first axis.

* * * * *